United States Patent
Zhang et al.

(10) Patent No.: US 11,313,988 B2
(45) Date of Patent: Apr. 26, 2022

(54) IDENTIFYING GEOLOGIC FEATURES IN A SUBTERRANEAN FORMATION USING SEISMIC DIFFRACTION IMAGING

(71) Applicant: Saudi Arabian Oil Company, Dhahran (SA)

(72) Inventors: Dongliang Zhang, Khobar (SA); Tong Wang Fei, Dhahran (SA); Constantinos Tsingas, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 99 days.

(21) Appl. No.: 16/713,438

(22) Filed: Dec. 13, 2019

(65) Prior Publication Data

US 2021/0181364 A1    Jun. 17, 2021

(51) Int. Cl.
*G01V 1/34* (2006.01)
(52) U.S. Cl.
CPC .......... *G01V 1/345* (2013.01); *G01V 2210/48* (2013.01)
(58) Field of Classification Search
CPC .......................... G01V 1/345; G01V 2210/48
USPC ........................................................ 702/16
See application file for complete search history.

(56) References Cited

U.S. PATENT DOCUMENTS

| 493,339 | A | 3/1893 | Phillips |
|---|---|---|---|
| 1,028,012 | A | 5/1912 | Foster |
| 3,441,631 | A | 4/1969 | Fernald et al. |
| 3,502,741 | A | 3/1970 | Fernald et al. |
| 3,688,249 | A | 8/1972 | Backus et al. |
| 3,691,529 | A | 9/1972 | Pizante |
| 4,449,208 | A | 5/1984 | Moeckel et al. |

(Continued)

FOREIGN PATENT DOCUMENTS

| CN | 105093301 | 11/2015 |
|---|---|---|
| CN | 106154319 | 11/2016 |

(Continued)

OTHER PUBLICATIONS

PCT International Search Report and Written Opinion in International Appln. No. PCT/US2019/031421, dated Aug. 5, 2019, 17 pages.

(Continued)

*Primary Examiner* — Michael P Nghiem
(74) *Attorney, Agent, or Firm* — Fish & Richardson P.C.

(57) ABSTRACT

A system for seismic imaging of a subterranean geological formation uses a two-way imaging condition. A seismic signal is emitted into a subterranean formation and recorded at receiver(s). Source and receiver wavefields are decomposed into respective right-down/left-up and left-down/right-up propagating waves. The right-down/left-up and left-down/right-up direction can be defined along the direction emitted from the source or receiver to corresponding direction in two dimensional (2D) case. An imaging condition for generating both a positive-dip structure image and a negative-dip structure image is the inner product of the wavefields. Applying the sample-by-sample multiplication imaging condition to the opposite dip images, the diffraction energy is retained while the reflection energy is significantly attenuated. The diffraction image can be used to detect faults and fractures in subsurface regions.

17 Claims, 22 Drawing Sheets

(56) References Cited

U.S. PATENT DOCUMENTS

| | | | |
|---|---|---|---|
| 4,562,540 A | 12/1985 | Devaney | |
| 4,935,904 A | 6/1990 | Chambers et al. | |
| 5,292,837 A | 3/1994 | Heinrich et al. | |
| 6,767,975 B1 | 7/2004 | Liu | |
| 7,085,195 B2 | 8/2006 | Taner et al. | |
| 7,157,532 B2 | 1/2007 | Payer et al. | |
| 7,196,969 B1 | 3/2007 | Karazincir | |
| 7,373,252 B2 | 5/2008 | Sherrill et al. | |
| 7,643,377 B1 | 1/2010 | Uzes | |
| 7,970,546 B1 | 6/2011 | Peng | |
| 8,116,168 B1 | 2/2012 | Luo et al. | |
| 8,209,125 B2 | 6/2012 | Berkovitch et al. | |
| 8,227,653 B2 | 7/2012 | Weber et al. | |
| 8,248,886 B2 | 8/2012 | Neelamani et al. | |
| 8,675,447 B2 | 3/2014 | Poole et al. | |
| 8,803,878 B2 | 8/2014 | Andersen et al. | |
| 8,948,463 B2 | 2/2015 | Landa et al. | |
| 9,116,255 B2 | 8/2015 | Eick et al. | |
| 9,128,205 B2 | 9/2015 | Guan et al. | |
| 9,536,143 B2 | 1/2017 | Jiang et al. | |
| 9,568,627 B2 | 2/2017 | Guigne et al. | |
| 9,575,194 B2 | 2/2017 | Khalil et al. | |
| 9,632,192 B2 | 4/2017 | Baina et al. | |
| 9,633,472 B2 | 4/2017 | Thomas et al. | |
| 9,651,694 B2 | 5/2017 | Zhang et al. | |
| 9,696,445 B2 | 7/2017 | Kluver et al. | |
| 9,702,997 B2 | 7/2017 | Sava et al. | |
| 9,715,027 B2 | 7/2017 | Gersztenkorn et al. | |
| 9,724,681 B2 | 8/2017 | Lucciulli et al. | |
| 9,726,771 B1 | 8/2017 | Popovici et al. | |
| 9,733,371 B2 | 8/2017 | Burnett et al. | |
| 9,766,357 B2 | 9/2017 | Cha | |
| 9,880,303 B2 | 1/2018 | Landa et al. | |
| 9,896,392 B2 | 2/2018 | Meiswinkel et al. | |
| 9,919,298 B2 | 3/2018 | Schmidt et al. | |
| 10,022,698 B2 | 7/2018 | Shaik et al. | |
| 10,232,339 B2 | 3/2019 | Bischof et al. | |
| 10,280,125 B2 | 5/2019 | Sogo et al. | |
| 10,281,604 B2 | 5/2019 | Jing et al. | |
| 10,295,685 B2 | 5/2019 | Zhang et al. | |
| 10,310,113 B2 | 6/2019 | Sun et al. | |
| 10,310,122 B2 | 6/2019 | Haacke et al. | |
| 10,324,204 B1 | 6/2019 | Sturzu et al. | |
| 10,557,954 B2 | 2/2020 | Tonellot et al. | |
| 10,641,916 B2 | 5/2020 | Ozbek et al. | |
| 10,889,533 B2 | 1/2021 | Melibari et al. | |
| 10,928,533 B2 | 2/2021 | Ji et al. | |
| 10,935,680 B2 | 3/2021 | Tsingas et al. | |
| 11,029,431 B2 | 6/2021 | Zhang et al. | |
| 11,041,970 B2 | 6/2021 | Zhang et al. | |
| 2004/0152850 A1 | 8/2004 | Payer et al. | |
| 2005/0219949 A1 | 10/2005 | Taner et al. | |
| 2007/0203673 A1 | 8/2007 | Sherrill et al. | |
| 2008/0285383 A1 | 11/2008 | An | |
| 2010/0097888 A1 | 4/2010 | Neelamani et al. | |
| 2010/0114494 A1 | 5/2010 | Higginbotham et al. | |
| 2010/0131205 A1 | 5/2010 | Berkovitch et al. | |
| 2010/0171740 A1 | 7/2010 | Andersen | |
| 2012/0016097 A1 | 1/2012 | Weber et al. | |
| 2012/0051176 A1 | 3/2012 | Liu | |
| 2012/0300584 A1 | 11/2012 | Eick et al. | |
| 2012/0307591 A1 | 12/2012 | Hegna et al. | |
| 2013/0060476 A1 | 3/2013 | Thomson | |
| 2013/0077832 A1 | 3/2013 | Landa et al. | |
| 2013/0176819 A1 | 7/2013 | Poole | |
| 2014/0032119 A1 | 1/2014 | Landa et al. | |
| 2014/0133275 A1 | 3/2014 | Guan et al. | |
| 2014/0149046 A1 | 5/2014 | Baina et al. | |
| 2014/0269183 A1 | 9/2014 | Kluver et al. | |
| 2014/0293744 A1 | 10/2014 | Zhang | |
| 2014/0321713 A1 | 10/2014 | Sava et al. | |
| 2014/0328140 A1 | 11/2014 | Khalil et al. | |
| 2015/0063066 A1 | 3/2015 | Burnett et al. | |
| 2015/0103623 A1 | 4/2015 | Gersztenkorn | |
| 2015/0112601 A1 | 4/2015 | Ozbek | |
| 2015/0124559 A1 | 5/2015 | Cha et al. | |
| 2015/0170411 A1 | 6/2015 | Thomas | |
| 2015/0203418 A1 | 7/2015 | Meiswinkel et al. | |
| 2015/0235081 A1 | 8/2015 | Jiang et al. | |
| 2015/0331123 A1 | 11/2015 | Guigne et al. | |
| 2016/0091624 A1 | 3/2016 | Haacke et al. | |
| 2016/0325274 A1 | 11/2016 | Schmidt | |
| 2016/0334526 A1 | 11/2016 | Pica | |
| 2016/0341837 A1 | 11/2016 | Eick | |
| 2016/0367977 A1 | 12/2016 | Shaikh et al. | |
| 2017/0001182 A1 | 1/2017 | Schmidt et al. | |
| 2017/0007994 A1 | 1/2017 | Lucciulli et al. | |
| 2017/0097428 A1 | 4/2017 | Sun | |
| 2017/0151547 A1 | 6/2017 | Shaik et al. | |
| 2017/0197892 A1 | 7/2017 | Khawaji | |
| 2018/0239041 A1 | 8/2018 | Tsingas et al. | |
| 2018/0292554 A1 | 10/2018 | Zhang et al. | |
| 2018/0327332 A1 | 11/2018 | Sogo et al. | |
| 2018/0345243 A1 | 12/2018 | Bischof et al. | |
| 2018/0356547 A1 | 12/2018 | Tonellot et al. | |
| 2019/0092707 A1 | 3/2019 | Melibari et al. | |
| 2019/0179044 A1 | 6/2019 | Zhang et al. | |
| 2019/0179045 A1 | 6/2019 | Zhang et al. | |
| 2019/0353812 A1 | 11/2019 | Zhang et al. | |
| 2020/0341160 A1* | 10/2020 | Ji | E21B 49/00 |
| 2021/0063570 A1 | 3/2021 | Liu et al. | |
| 2021/0215842 A1 | 7/2021 | Liu et al. | |
| 2021/0278558 A1 | 9/2021 | Zhang et al. | |

FOREIGN PATENT DOCUMENTS

| | | |
|---|---|---|
| CN | 109307890 | 2/2019 |
| EP | 0109341 | 2/1991 |
| EP | 3029491 | 6/2016 |
| GB | 2483997 | 3/2012 |
| WO | WO 2011154762 | 12/2011 |
| WO | WO 2013163131 | 10/2013 |
| WO | WO 2016156530 | 10/2016 |

OTHER PUBLICATIONS

Bahorich and Farmer, "3D Seismic Discontinuity for Faults and Stratigraphic Features: the Coherence Cube," The Leading Edge, vol. 14, 1995, 6 pages.

Chen et al., "Directly imaging steeply-dipping fault zones in geothermal fields with multicomponent seismic data," Geothermics vol. 57, Sep. 1, 2015, 31 pages.

Fei et al., "Removing false images in reverse time migration: The concept of de-primary," Geophysics vol. 80, No. 6, Nov.-Dec. 2015, 8 pages.

Liu et al., "Imagining diffractors using wave-equation migration," Geophysics vol. 81, No. 6, Nov.-Dec. 2016, 10 pages.

Luo et al., "Edge-preserving smoothing and applications," The Leading Edge, vol. 21, 2002, 5 pages.

Sturzu et al., "Diffraction imaging using specularity gathers," Journal Seismic Exploration vol. 23, Feb. 2014, 18 pages.

Zhang and Zhang, "Diffraction imaging using shot and opening angle gathers: A prestack time migration approach," Geophysics vol. 79, No. 2, Mar.-Apr. 2014, 11 pages.

Zhang et al., "Improving reverse time migration angle gathers by efficient wavefield separation". Geophysics, vol. 83, No. 2, Mar. 1, 2018 (Mar. 1, 2018), pp. S187-S195.

Zhang et al., "RTM angle gathers by optical flow with wavefield separation", SEG Technical Program Expanded Abstracts 2018, Aug. 27, 2018 (Aug. 27, 2018), 5 pages.

Zhang et al., "Efficient Wave-Equation-Based Diffraction Imagining," Geophysics, vol. 82, No. 5, Sep.-Oct. 2019, 11 pages.

Gong et al., "Polarized Wavefield Magnitudes with Optical Flow for Elastic Angle-Domain Common-Image Gathers," Geophysics, Jul.-Aug. 2016, 81(4):S239-S251.

Dafni et al., "Diffraction imaging by prestack reverse-time migration in the dip angle domain: diffraction imaging by reverse-time migration," Geophysical Prospecting, Oct. 2017, 65(14):295-316.

PCT International Search Report and Written Opinion in International Appln. No. PCT/US2020/049045, dated Dec. 15, 2020, 19 pages.

(56) References Cited

OTHER PUBLICATIONS

Fei et al., "An Endemic Problem in Reverse-Time Migration," 84th Annual International Meeting, SEG, Expanded Abstracts, Published in 2014, pp. 3811-3815.
Fei et al., "Removing False Images in Reverse-Time Migration: The Concept of De-Primary," Geophysics, vol. 80, No. 6, Nov.-Dec. 2015, pp. S237-S244.
Fletcher, "Suppressing Unwanted Internal Reflections in Prestack Reverse-Time Migration," Geophysics, vol. 71, No. 6, Nov.-Dec. 2006, pp. E79-E82.
Fomel, "Theory of 3-D Angle Gathers in Wave-Equation Imaging," 74th Annual International Meeting, SEG, Expanded Abstracts, Oct. 2004, pp. 1053-1056.
Forestiere et al., "Oligomerization of Monoolefins by Homogenous Catalysts", Oil & Science and Technology Review de l'Institute Francais du Petrole, vol. 64, No. 6, Nov. 2009, pp. 663-664, 20 pages.
Hu et al., "Angle gathers from reverse time migration using analytic wavefield propagation and decomposition in the time domain," Geophysics, vol. 81, No. 1, Jan. 1, 2016, 9 pages.
Khaidukov et al., "Diffraction imaging by focusing-defocusing: An outlook on seismic superresolution," Geophysics, vol. 69, No. 6, Nov.-Dec. 2004, 13 pages.
Kim et al., "3D Least-Squares Reverse Time Migration Using Wavefield Decomposition via Hilbert transform," 79th EAGE Conference & Exhibition, Jun. 12, 2017, 5 pages.
Klokov et al., "Separation and imaging of seismic diffractions using migrated dip-angle gathers," Geophysics, vol. 77, No. 6, S131-S143.
Kong et al., "Diffraction separation by plane-wave prediction filtering," Chinese Geophysical Society, Appl. Geophys. (2017) 14: 399, Jul. 2017.
Landa et al., "Separation, imaging and velocity analysis of seismic diffractions using migrated dip-anle gathers," 78th Annual International Meeting, SEG, Expanded Abstracts, 2008, 5 pages.
Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.
Liu et al., "An Effective Imaging Condition for Reverse-Time Migration using Wavefield Decomposition," Geophysics, vol. 76, No. 1, Jan. 2011, pp. S29-S39.
Liu et al., "Reverse-Time Migration using One-Way Wavefield Imaging Condition," 77th Annual International Meeting, SEG Expanded Abstracts, published in 2007, pp. 2170-2174.
Mahdaviani, et al., "Selective Ethylene Dimerization Toward 1-butene by a New Highly Efficient Catalyst System and Determination of Its Optimum Operating Conditions in a Buchi Reactor," International Journal of Chemical Engineering and Applications, vol. 1, No. 3, Oct. 2010, pp. 276-281, 6 pages.
Popovici et al., "High resolution diffraction imaging of small scale fractures in shale and carbonate reservoirs," Unconventional Resources Technology Conference, 2015, 9 pages.
Qin et al., "Kirchhoff preSDM interactive dip-gather stacking and dip illumination panel generation," 75th Annual International Meeting, SEG, Expanded Abstracts, 2005, 5 pages.
Sava et al. "Angle-Domain Common Image Gathers by Wavefield Continuation Methods," Geophysics, 68, May-Jun. 2003, pp. 1065-1074.
Schoepp et al., "Multifocusing 3D diffraction imaging for detection of fractured zones in mudstone reservoirs: Case history," Interpretation 3(1), Feb. 2015, 12 pages.
Sun et al., "Comparative study of dip-angle domain Gaussian beam migration and Kirchhoff migration in diffraction separation," SEG Technical Program Expanded Abstracts, 2014, 5 pages.
Taner et al., "Separation and imaging of seismic diffractions using plane-wave decomposition," SEG Technical Program Expanded Abstracts, 25(1), Jan. 2006.
Wang et al., "RTM Artifact Removal Via a Fast Algorithm for Wavefield Decomposition," 2016 SEG International Exposition and 86th Annual Meeting, 2016.

Wang et al., "Up/down and P/S decompositions of elastic wavefields using complex seismic traces with applications to calculations Poynting vectors and angle-domain common-image gathers from reverse time migrations," Geophysics, vol. 81, No. 4, Jul. 1, 2016, 15 pages.
Xu et al., "3D Angle Gathers from Reverse-Time Migration," Geophysics, vol. 76, No. 2, Mar.-Apr. 2011, pp. S77-S92.
Zhang, "RTM Angle Gathers and Specular Filter (SF) RTM using Optical Flow," 84rd Annual International Meeting, SEG, Expanded Abstracts, Copyright 2014, pp. 3816-3820.
Gulf Cooperation Council Examination Report issued in GCC Appln. No. GC 2018-35094, dated Nov. 7, 2019, 4 pages.
PCT International Search Report and Written Opinion issued in International Appln. No. PCT/US2018/049834, dated Dec. 20, 2018, 17 pages.
PCT International Search Report and Written Opinion issued in International Appln. No. PCT/US2018/026071, dated Jul. 9, 2018, 15 pages.
PCT International Search Report and Written Opinion in International Appln. No. PCT/US2020/064511, dated Apr. 1, 2021, 17 pages.
Wang et al., "Reverse Time Migration with Hilbert Transform Based Full Wavefield Decomposition" Chinese Journal of Geophysics—Chinese Edition 59.11, Nov. 2016, 4200-4211, 12 pages.
Zhong et al., "Reverse Time Migration of Ground-Penetrating Radar with Full Wavefield Decomposition Based on the Hilbert Transform" Geophysical Prospecting 68.4, Apr. 2020, 1097-1112, 16 pages.
Gulf Cooperation Council Examination Report issued in GCC Appln. No. GC 2018-35094 dated Mar. 4, 2020, 3 pages.
GCC Examination Report in GCC Appln. No. GC 2019-37569, dated Nov. 24, 2020, 5 pages.
CN Office action in Chinese Appln. No. 201880037535.2, dated Apr. 30, 2021, 21 pages (With English Translation).
He et al., "Reflection waveform inversion with variable density." Journal of Applied Geophysics 170, 103827, Nov. 2019, 16 pages.
PCT International Search Report and Written Opinion in International Appln. No. PCT/US2021/012193, dated Apr. 20, 2021, 18 pages.
Batany et al., "Adaptive multiple subtraction: Unification and Comparison of matching filters based on the lq-norm and statistical independence," Geophysics vol. 81, No. 1, Jan.-Feb. 2016, 13 pages.
Berkhout and Verschuur, "Estimation of multiple scattering by iterative inversion, Part I: Theoretical considerations," Geophysics vol. 62, No. 5, Sep.-Oct. 1997, 10 pages.
Chen and Fomel, "Random noise attenuation using local signal-and-noise orthogonalization," Geophysics vol. 80, No. 6, WD1-WD9, 2015, 19 pages.
Donno , "Improving multiple removal using least-squares dip filters and independent component analysis," Geophysics vol. 76, No. 5, Sep.-Oct. 2011, 14 pages.
Donno et al., "Curvelet-based multiple prediction," Geophysics vol. 75, No. 6, Nov.-Dec. 2010, 9 pages.
Fomel, "Shaping regularization in geophysical-estimation problems," Geophysics vol. 72, No. 2, Mar.-Apr. 2007, 8 pages.
Guitton and Verschuur, "Adaptive subtraction of multiples using the L1-norm," Geophysical Prospecting, vol. 52, Issue 1, Jan. 2004, 12 pages.
Guitton, "Multiple attenuation in complex geology with a pattern-based approach," Geophysics vol. 70, No. 4, Jul.-Aug. 2005, 11 pages.
Herrmann et al., "Non-linear primary-multiple separation with directional curvelet frames," Geophysical Journal International vol. 170, Issue 2, Aug. 2007, 19 pages.
Kim et al., "Increasing signal-to-noise ratio of marine seismic data: a case study from offshore Korea," Journal of Applied Geophysics, vol. 134, Nov. 2016.
Li and Lu, "Demultiple strategy combining Radon filtering and Radon domain adaptive multiple subtraction," Journal of Applied Geophysics, vol. 103, Apr. 2014, 11 pages.

(56) References Cited

OTHER PUBLICATIONS

Rickett et al., "P167—Adaptive multiple subtraction with non-stationary helical shaping filters," EAGE 63rd Conference and Technical Exhibition, Jun. 11-15, 2001, 4 pages.
Spitz, "Pattern recognition, spatial predictability and subtraction of multiple events," the Leading Edge, Jan. 1999, 4 pages.
Ventosa et al., "Adaptive multiple subtraction with wavelet-base complex urary Wiener filters," Jun. 2018, published in Geophysics vol. 77, Nov.-Dec. 2012, 18 pages.
Verschuur et al., "Adaptive surface-related multiple elimination," Geophysics vol. 57, No. 9, Sep. 1992, 12 pages.
Wang, "Multiple subtraction using an expanded multichannel matching filter," Geophysics vol. 68, No. 1, Jan.-Feb. 2003, 9 pages.
Wiggins, "Multiple attenuation by explicit wave extrapolation to an interpreted horizon," the Leading Edge, Jan. 1999, 7 pages.
Xue et al., "Amplitude-perserving nonlinear adaptive multiple attenuation using the high order sparse Radon Transform," Sinopec Geophysical Research Institute, IOP Science, Journal of Geophysics and Engineering, vol. 31, No. 3, Apr. 2016, 2 pages.
GCC Examination Report in GCC Appln. No. GC 2019-37569, dated Jun. 6, 2021, 4 pages.
PCT International Search Report and Written Opinion in International Appln. No. PCT/US2021/021484, dated Jun. 24, 2021, 13 pages.
GCC Examination Report in GCC Appln. No. GC 2019-37569, dated Jun. 29, 2020, 4 pages.
GCC Examination Report in GCC Appln. No. GC 2020-41105, dated Oct. 24, 2021, 6 pages.

\* cited by examiner

IDENTIFYING GEOLOGIC FEATURES IN A SUBTERRANEAN FORMATION USING SEISMIC DIFFRACTION IMAGING

TECHNICAL FIELD

The present disclosure generally relates to an approach for identifying geologic features in a subterranean formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This disclosure describes systems and methods for an efficient two-way imaging condition-based technique to image subsurface geologic features using diffracted seismic waves. This approach has the ability to clearly reveal important geologic features, such as isolated scatterers, reflector edges, fault surfaces, fracture zones, and erosional surfaces that are often of high interest in seismic exploration.

Generally, there are two approaches for performing imaging diffraction. A first approach includes separating diffraction seismic data from reflection seismic data in the field recorded seismic data. Only the diffraction seismic data are then imaged to generate the diffraction image. A second approach includes using an imaging condition to separate the diffraction and diffraction image while imaging recorded seismic data. The two-way imaging condition-based technique described in this document uses the latter approach.

The two-way imaging condition is used instead of a one-way imaging condition because two-way imaging condition can save computation cost and provide wider illumination, as subsequently described. The one and two-way imaging conditions vary regarding wavefield decomposition.

Generally, the described processes include the following steps. Source and receiver wavefields are decomposed into their respective right-down/left-up and left-down/right-up propagating waves. The right-down/left-up and left-down/right-up direction can be defined along the direction emitted from the source or receiver to corresponding direction in two dimensional (2D) case. An imaging condition for generating both a positive-dip structure image and a negative-dip structure image is the inner product of the wavefields. A positive-dip feature includes a subsurface feature with positive values of tan(dx/dz) (slope), and a negative-dip feature includes a subsurface feature with negative values of tan(dv/dz) (slope) (and is approximately orthogonal to the positive-dip feature). The negative-dip structure image is generated by applying the imaging condition to the right-down/left-up going source and receiver wavefields. Likewise, the positive-dip structure image is generated applying the imaging condition to the left-down/right-up going source and receiver wavefields. The reflection image generally exists in either positive-dip or negative-dip structure image. However the diffraction image exhibits in both images. Applying the sample-by-sample multiplication imaging condition to the opposite dip images, the diffraction energy is retained while the reflection energy is significantly attenuated. The diffraction image can be used to detect faults and fractures in subsurface regions. The detected faults and fractures are important to identify the reservoir. A diffraction image can image subsurface geologic features such as isolated scatterers, reflector edges, fault surfaces, fracture zones, erosional surfaces and so on.

The described implementations can provide various technical benefits. For instance, diffraction imaging can increase the spatial resolution of the seismic images beyond the conventional means to provide to the interpreters with high-resolution structural and stratigraphic sections.

The one-way imaging condition uses the left-down-going source and receiver wavefields to calculate the positive-dip structure image and the right-down-going source and receiver wavefields to generate the negative-dip structure image. The one-way imaging condition can be difficult for several reasons. First, the system computes the up-going and down-going wavefields by Hilbert transform with respect to time and depth for both source and receiver wavefields. This operation generally includes two additional forward models with the Hilbert-transformed source and receiver wavefields. Second, the information provided by the up-going wave is missing if the system uses only the down-going wave to generate two opposite dip structure images.

To overcome the limitations of the one-way imaging condition, the systems and methods described in this disclosure use a two-way imaging condition of positive-dip and negative-dip structure images. Impulse response analysis demonstrates that the two-way imaging condition has the ability to image the positive-dip and negative-dip structure images separately. Without up- and down-going wavefield separation, the up-going source and receiver wavefields can generate the same structure dip as using the down-going source and receiver wavefields. Results show that using the two-way imaging condition can provide broader illumination and enhance the diffraction image because of extra contribution from the up-going wavefield. In addition, the approach saves almost half the computation cost compared to using the one-way imaging condition.

In an aspect, a system for seismic imaging of a subterranean geological formation includes a wavefield generation module. The wavefield generation module is configured to generate a source wavefield from seismic data representing a subterranean formation and generate a receiver wavefield from the seismic data representing the subterranean formation. Generally, the system includes a wavefield decomposition module that is configured to decompose the source wavefield into a source left-down/right-up component and a source right-down/left-up component. The wavefield decomposition module is configured to decompose the receiver wavefield into a receiver left-down/right-up component and a receiver right-down/left-up component. The system includes a cross-correlation module configured to apply an inner product of the source left-down/right-up component and the receiver left-down/right-up component to generate a positive-dip imaging condition and apply an inner product of the source right-down/left-up component and the receiver right-down/left-up component to generate a negative-dip imaging condition. The system includes a diffraction rendering module configured to multiply the positive-dip imaging condition with the negative-dip imaging condition to generate a diffraction-enhanced seismic image.

In some implementations, generating the diffraction-enhanced seismic image is independent from separating reflection portions from diffraction portions of the seismic data. In some implementations, generating the diffraction-enhanced seismic image in reduces a computation cost by at least 40% relative to a computation cost of generating the diffraction-enhanced seismic image independent from multiplying the positive-dip imaging condition and the negative-dip imaging condition.

In some implementations, the diffraction-enhanced seismic image comprises an increased field of illumination with respect to a seismic image generated independent from multiplying the positive-dip imaging condition and the negative-dip imaging condition.

Generally, decomposing each of the source wavefield and the receiver wavefield comprises a Hilbert transform with respect to an axis parallel to a surface of the subterranean geological formation and an axis orthogonal to the surface of the subterranean geological formation.

In some implementations, an up-going component of each of the source wavefield and the receiver wavefield is oriented toward a surface of the subterranean geological formation, and a down-going component of each of the source wavefield and the receiver wavefield is oriented away from the surface of the subterranean geological formation.

In some implementations, the diffraction rendering module is configured to render the diffraction-enhanced seismic image for presentation on a user interface.

In an aspect, a process for seismic imaging of a subterranean geological formation includes generating a source wavefield from seismic data representing a subterranean formation. The process includes generating a receiver wavefield from the seismic data representing the subterranean formation; decomposing the source wavefield into a source left-down/right-up component and a source right-down/left-up component. The process includes decomposing the receiver wavefield into a receiver left-down/right-up component and a receiver right-down/left-up component. The process includes applying an inner product of the source left-down/right-up component and the receiver left-down/right-up component to generate a positive-dip imaging condition. The process includes applying an inner product of the source right-down/left-up component and the receiver right-down/left-up component to generate a negative-dip imaging condition. The process includes multiplying the positive-dip imaging condition with the negative-dip imaging condition to generate a diffraction-enhanced seismic image.

In some implementations, generating the diffraction-enhanced seismic image is independent from separating reflection portions from diffraction portions of the seismic data.

In some implementations, wherein generating the diffraction-enhanced seismic image in reduces a computation cost by at least 40% relative to a computation cost of generating the diffraction-enhanced seismic image independent from multiplying the positive-dip imaging condition and the negative-dip imaging condition.

In some implementations, the diffraction-enhanced seismic image comprises an increased field of illumination with respect to a seismic image generated independent from multiplying the positive-dip imaging condition and the negative-dip imaging condition.

In some implementations, decomposing each of the source wavefield and the receiver wavefield comprises a Hilbert transform with respect to an axis parallel to a surface of the subterranean geological formation and an axis orthogonal to the surface of the subterranean geological formation.

In some implementations, an up-going component of each of the source wavefield and the receiver wavefield is oriented toward a surface of the subterranean geological formation, and a down-going component of each of the source wavefield and the receiver wavefield is oriented away from the surface of the subterranean geological formation.

In some implementations, the process includes rendering the diffraction-enhanced seismic image for presentation on a user interface.

In an aspect, one or more non-transitory computer readable media storing instructions that are executable by one or more processors are configured to perform operations for seismic imaging of a subterranean geological formation. Generally, the operations include generating a source wavefield from seismic data representing a subterranean formation. The operations include generating a receiver wavefield from the seismic data representing the subterranean formation. The operations include decomposing the source wavefield into a source left-down/right-up component and a source right-down/left-up component. The operations include decomposing the receiver wavefield into a receiver left-down/right-up component and a receiver right-down/left-up component. The operations include applying an inner product of the source left-down/right-up component and the receiver left-down/right-up component to generate a positive-dip imaging condition. The operations include applying an inner product of the source right-down/left-up component and the receiver right-down/left-up component to generate a negative-dip imaging condition. The operations include multiplying the positive-dip imaging condition with the negative-dip imaging condition to generate a diffraction-enhanced seismic image.

In some implementations, generating the diffraction-enhanced seismic image is independent from separating reflection portions diffraction portions of the seismic data.

In some implementations, wherein generating the diffraction-enhanced seismic image in reduces a computation cost by at least 40% relative to a computation cost of generating the diffraction-enhanced seismic image independent from multiplying the positive-dip imaging condition and the negative-dip imaging condition.

Generally, the diffraction-enhanced seismic image comprises an increased field of illumination with respect to a seismic image generated independent from multiplying the positive-dip imaging condition and the negative-dip imaging condition.

In some implementations, an up-going component of each of the source wavefield and the receiver wavefield is oriented toward a surface of the subterranean geological formation, and a down-going component of each of the source wavefield and the receiver wavefield is oriented away from the surface of the subterranean geological formation.

In some implementations, the actions include rendering the diffraction-enhanced seismic image for presentation on a user interface.

The details of one or more embodiments are set forth in the accompanying drawings and the description below. Other features and advantages will be apparent from the description and drawings, and from the claims.

DETAILED DESCRIPTION

Figure 1:
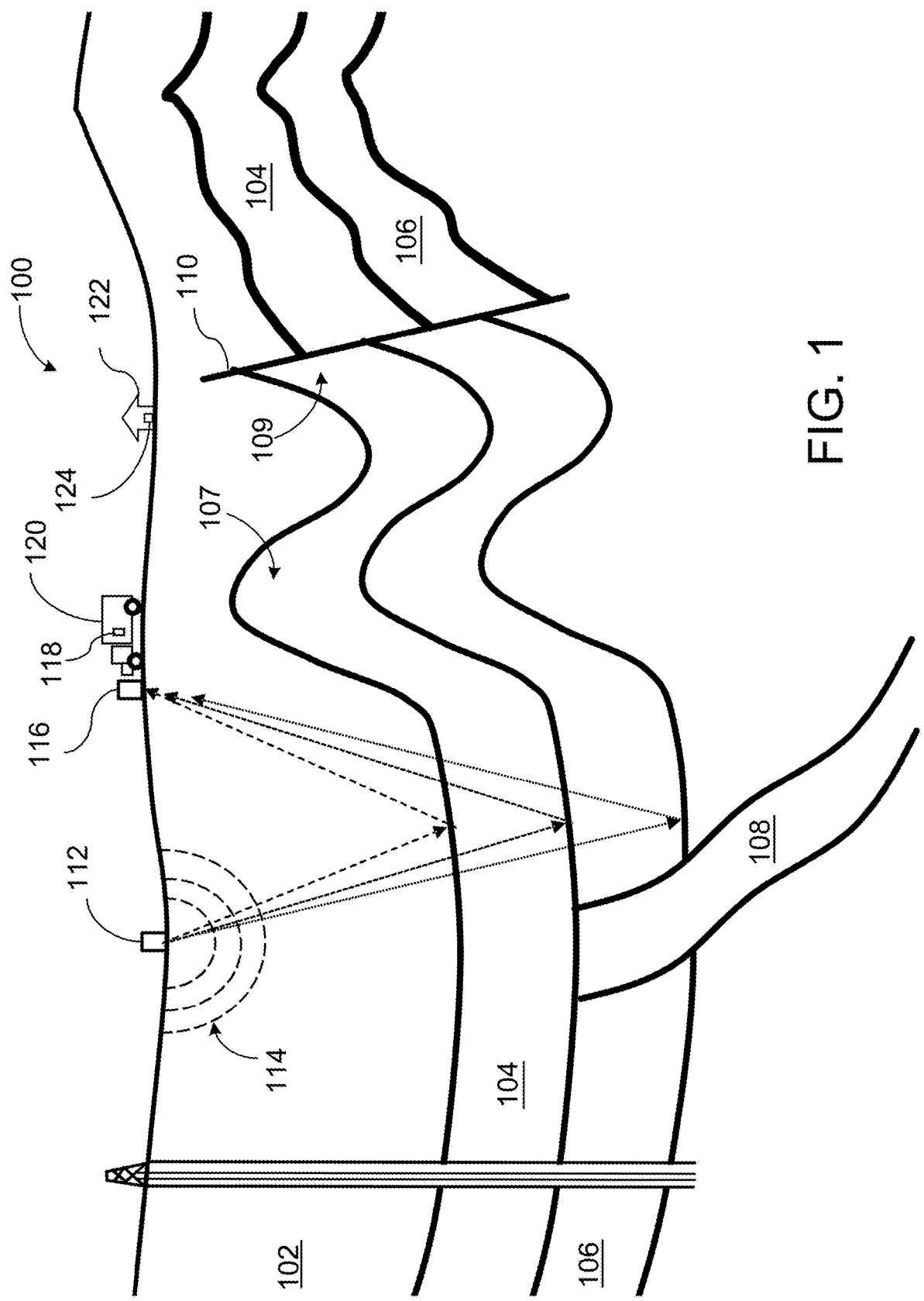
FIG. 1 is a schematic view of a seismic survey being performed to map subterranean features such as facies and faults.

Generally, reflections and diffractions are the main seismic signal events providing subsurface information. Seismic imaging and inversion of reflections are the workflows in the industry to reveal subsurface geologic structure and stratigraphy and to generate rock properties for reservoir characterization. Although diffractions are generally weaker than reflections, diffraction imaging and inversion provides equally important subsurface information. Moreover, diffractions can be used for high resolution seismic imaging beyond the classical Rayleigh limit. Diffraction-enhanced seismic sections assist and contribute significantly in the interpretation and identification of small-scale faults and fractures, and they are used in addition to other derived poststack attributes such as coherency and curvature cubes.

Diffraction imaging techniques can generally be separated into two main categories. In the first category, reflection and diffraction events are separated in the poststack or prestack data domain and then the diffraction events are used to image the corresponding diffractors or short wavelength discontinuities. In the second category, diffraction and reflection events are migrated simultaneously, then the diffraction and reflection images are separated in the image domain. The dip-angle domain is the one of most commonly used domains where the separation of diffractions and reflections can be performed. Most diffraction-imaging methods are based on ray theory. Ray-based methods are derived from solutions of the wave-equation approximated at high frequencies (e.g., short wavelengths with respect to scattering). Although these solutions are fast and efficient relative to non-approximated solutions at relatively low frequencies, they may fail to describe the physics of diffraction propagation and imaging in complex medium. In reality, diffractions are wave phenomena occurring when the dominated seismic wavelength is shorter or comparable to the scale of subsurface geological features or heterogeneities. Therefore, wave-equation-based methods can be used when ray theory fails.

The data processing system that is subsequently described is configured to perform wave-equation-based diffraction imaging. Reflection energy exists either in the negative-dip or positive-dip structure images, while the primarily focused diffraction image occurs in both dip structure images. The data processing system uses a two-way multiplication diffraction imaging condition. The positive-dip structure includes structures in which the reflector has positive values for tan(dx/dz) and negative-dip structure with negative values of tan(dx/dz). Using this methodology, the data processing system avoids the high computational cost associated with the calculation and disk storage of five-dimensional (5D) dip angle gathers which are needed to separate reflections from diffractions.

The proposed methodology comprises three main steps. First, the data processing system decomposes the source and receiver wavefields into left-down/right-up and right-down/left-up propagating waves, respectively. Second, the data processing system applies the conventional zero-lag cross-correlation imaging condition to the right-down/left-up-going source and the right-down/left-up-going receiver wavefields to generate the negative-dip structure image. Similarly, the data processing system generates a positive-dip structure image. A positive-dip feature includes a subsurface feature with positive slopes, and a negative-dip feature includes a subsurface feature with negative slopes (and is approximately orthogonal to the positive-dip feature). Third, the data processing system multiples the negative-dip and positive-dip structure images sample by sample to form the final diffraction-only image. In response to the multiplication of both dip-structure images, the data processing system suppresses the reflection energy and enhances the diffraction energy. Except for the horizontal wavefield separation, a one-way imaging condition-based method requires the separation of the up-down wavefield to generate the positive-dip and negative-dip structure images resulting in increasing computation time and reducing the contribution from the up-going waves. In contrast, the two-way imaging condition applied by the data processing system can correctly generate the negative-dip and positive-dip structure images both without up-down wavefield separation prior to diffraction imaging and also by only applying the horizontal wavefield separation. In this way, the remaining up-going wave is utilized to provide more information to the diffraction imaging and contribute additional subsurface illumination.

FIG. 1 is a schematic view of a seismic survey being performed to map subterranean features such as facies and faults in a subterranean formation 100. The seismic survey provides the underlying basis for implementation of the systems and methods described with reference to FIGS. 4A-4B. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow along with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends on several properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also be display results of the analysis of the seismic data associated with the seismic survey.

Figure 2:
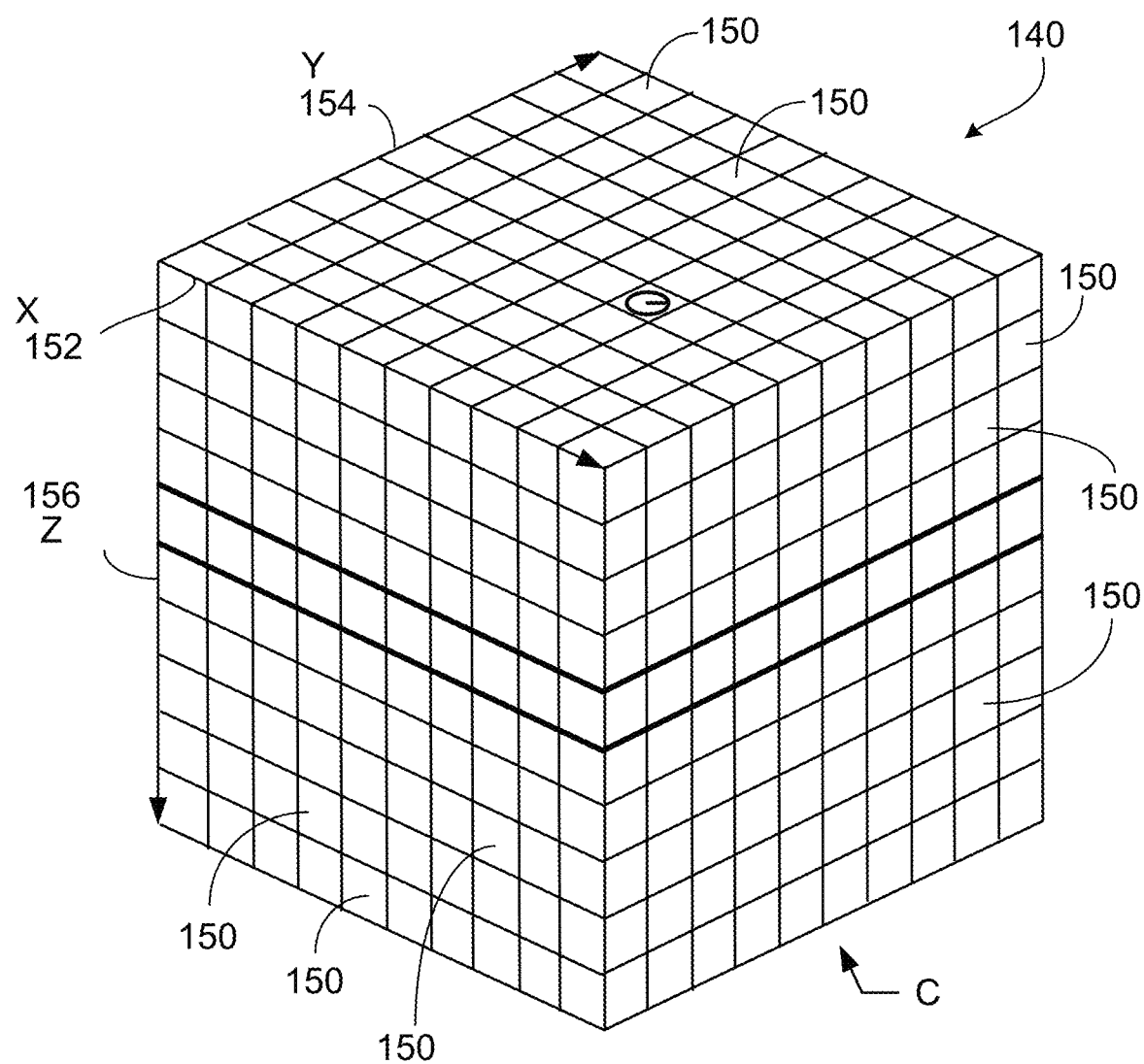
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
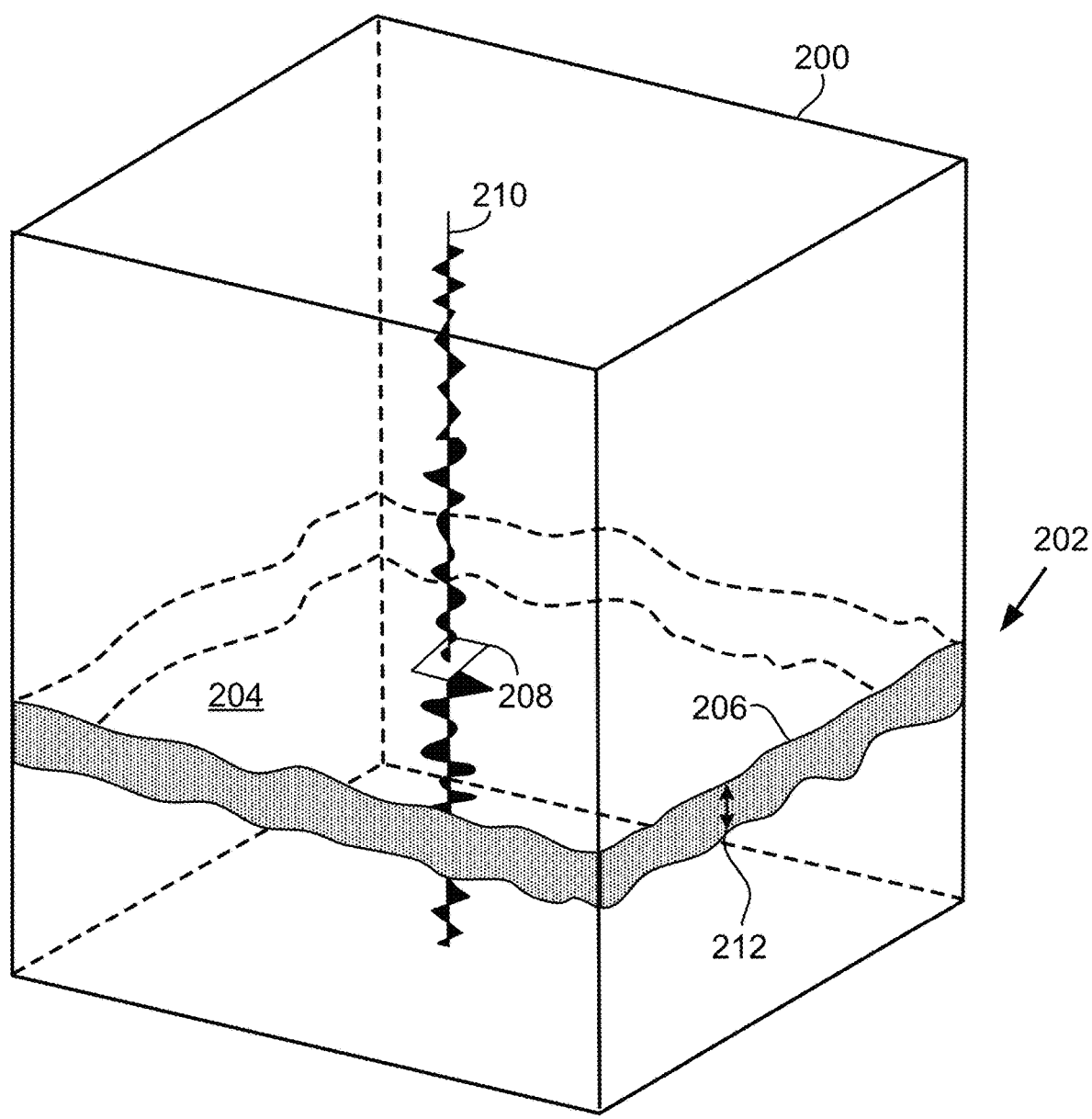
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4A:
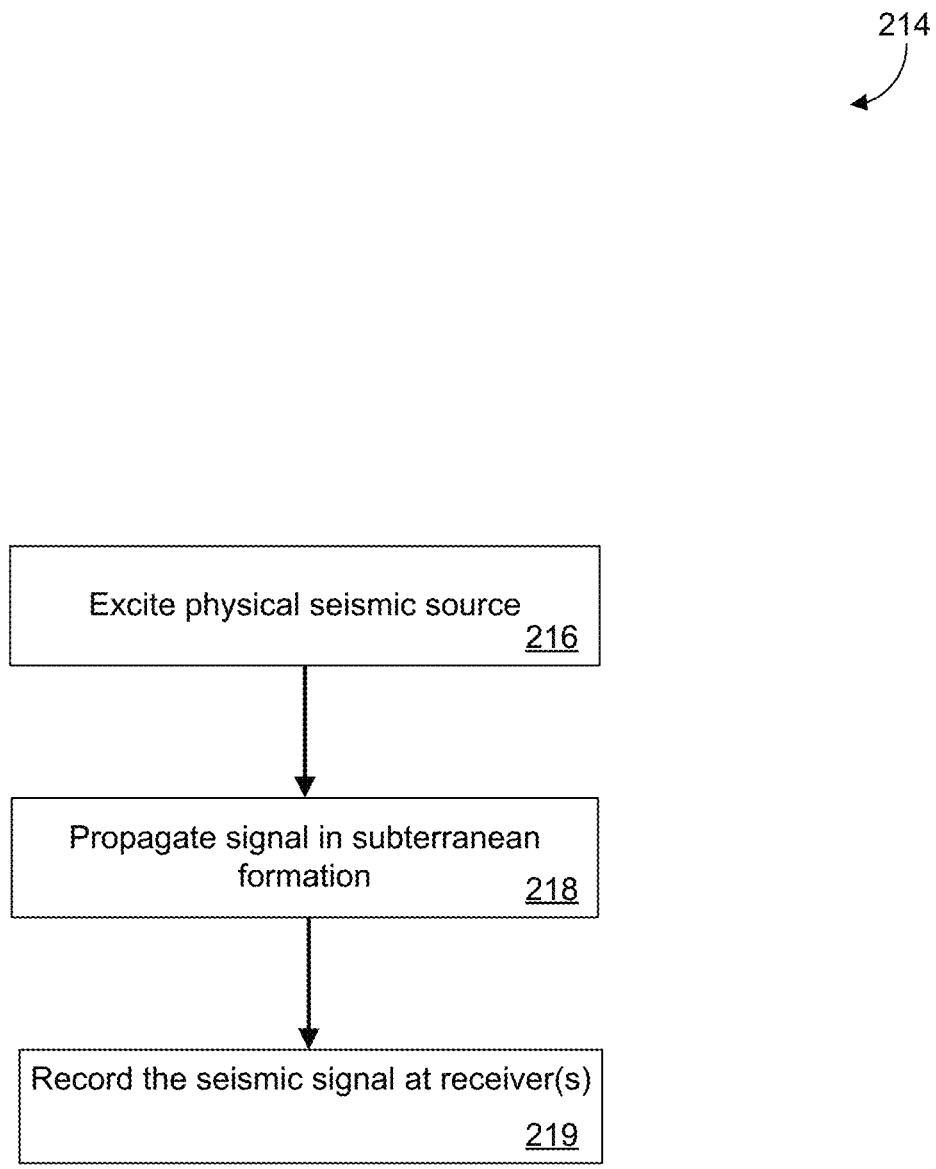
FIGS. 4A-4B illustrate flow diagrams including example processes for identifying geologic features in a subterranean formation using seismic diffraction imaging.
Figure 4B:
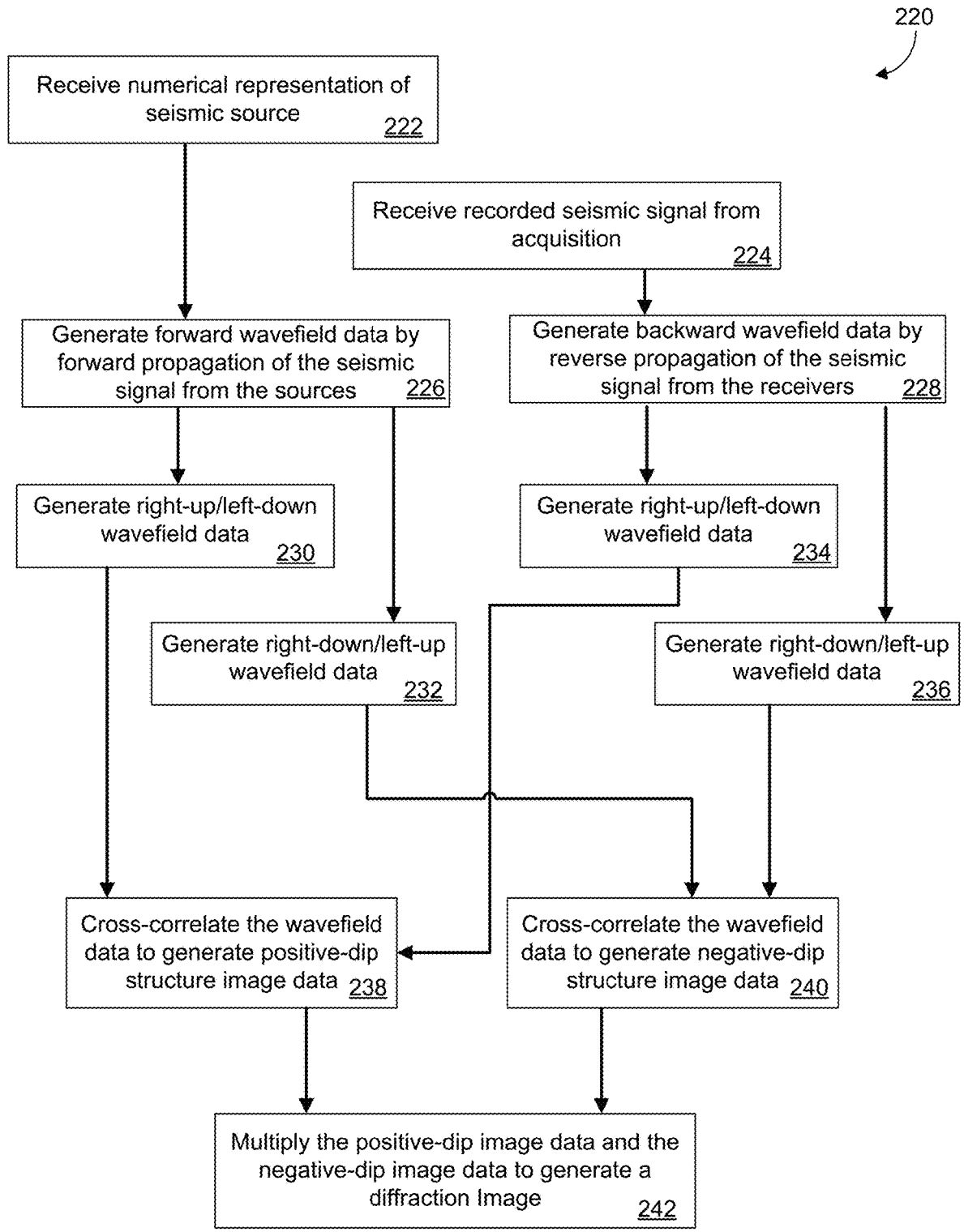
Figure 5:
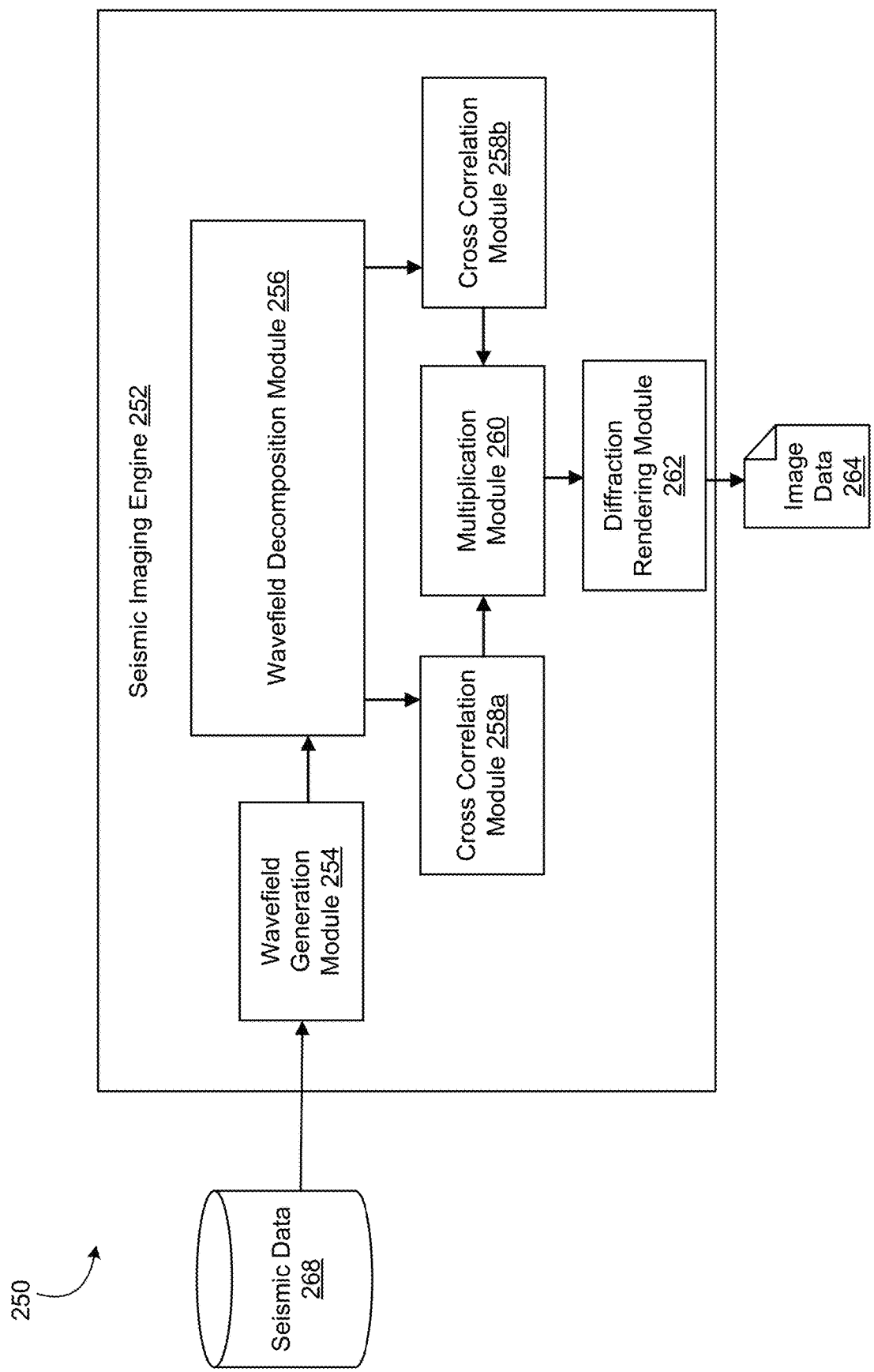
FIG. 5 is a block diagram of an example system for identifying geologic features in a subterranean formation using seismic diffraction imaging.

FIGS. 4A-4B illustrate flow diagrams including example processes 214 and 220, respectively, for identifying geologic features in a subterranean formation using seismic diffraction imaging. FIG. 5 shows a data processing system 250 for identifying geologic features in a subterranean formation using seismic diffraction imaging. The data processing system 250 of FIG. 5 is configured to execute the processes 220 of FIG. 4B.

Turning to FIG. 4A, a process 214 performed by a physical acquisition system (such as a part of system described in relation to FIG. 1) is shown. One or more sources (such as source 112 of FIG. 1) are excited (216) to generate a seismic signal in the formation 100. The seismic signal is propagated (218) through subterranean formation 100 and recorded (219) at receiver(s) (such as source 116 of FIG. 1).

The recorded signal at the receiver and a numerical representation of the generated signal at the source can be used by the seismic imaging engine 252 of FIG. 5 for generating the diffraction image from a seismic model, as shown in process 220 of FIG. 4B. In an aspect, seismic imaging engine 252 is configured to receive the seismic data 268 and generate structure image data 264 of the subterranean formation using a series of modules. The modules can include a wavefield generation module 254, a waveform decomposition module 256, cross-correlation modules 258a and 258b, a multiplication module 260, and a diffraction rendering module 262.

Describing the process 220 of FIG. 4B with the system 252 of FIG. 5, the wavefield generation module 254 is configured to obtain seismic data 268 that is generated by one or more sources and received by one or more receivers. In an example, the wavefield generation module 254 receives (222) the representation of the seismic signal in a subterranean formation. The wavefield generation module 254 receives (224) the seismic data 268 recorded by the receivers. The waveform generation module 254 generates (226) from the seismic data 268 forward wavefield data by forward propagation of the seismic signal from the sources. In other words, the waveform generation module 254 is configured to generate a source wavefield from source representing a subterranean formation. The waveform generation module 254 is configured to generate (228) backward wavefield data by reverse propagation of the seismic signal from the receivers. In other words the wavefield generation module 254 is configured to generate a receiver wavefield from the seismic data representing the subterranean formation.

The wavefield decomposition module 256 configured to decompose the source wavefield to generate (230) a source left-down/right-up component and generate (232) a source right-down/left-up component. The wavefield decomposition module 256 is configured to decompose the receiver wavefield to generate (234) a receiver left-down/right-up component and generate (236) a receiver right-down/left-up component.

The cross-correlation module 258a is configured to apply (238) an inner product of the source left-down/right-up component and the receiver left-down/right-up component to generate a positive-dip imaging condition. The cross-correlation module 258b is configured to apply (240) an inner product of the source right-down/left-up component and the receiver right-down/left-up component to generate a negative-dip imaging condition.

The diffraction rendering module is configured to multiply (242) the positive-dip imaging condition with the negative-dip imaging condition to generate a diffraction-enhanced seismic image 264. This process is further described in relation to FIGS. 6-10.

Figure 6:
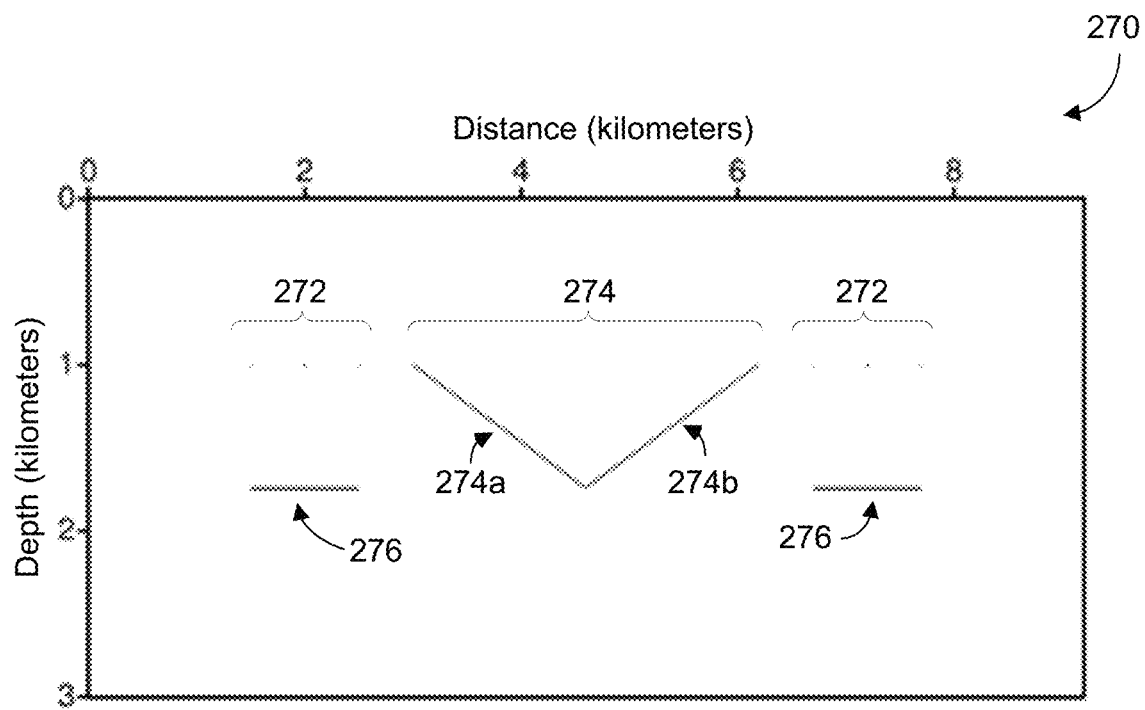
FIG. 6 shows an example structure for illustrating an example reflectivity model.

FIG. 6 shows in graph 270 an example structure illustrating an example reflectivity model is. The seismic imaging engine 252 of the data processing system 250 is configured to execute a wave-equation based multiplication imaging condition for diffraction imaging. The seismic imaging engine 252 utilizes a feature of the imaging in which a generated diffraction image exists in both positive-dip and negative-dip structure images after migration, but a generated reflection image only exists in either a positive-dip or negative-dip structure image. The multiplication module 260 applies the sample-by-sample multiplication imaging condition to the opposite dip images, and the diffraction energy is retained and the reflection energy is significantly attenuated. The graph 270 shows a simple reflectivity model with six scatterers 272, two flat layers 276 and a V-type structure 274 including a positive-dip portion 274b and a negative-dip portion 274a. Using this model, the modeled seismic data contain both reflected events generated from the reflectors and diffraction events from individual scatterers 272 and reflector edges 276.

Figure 7:
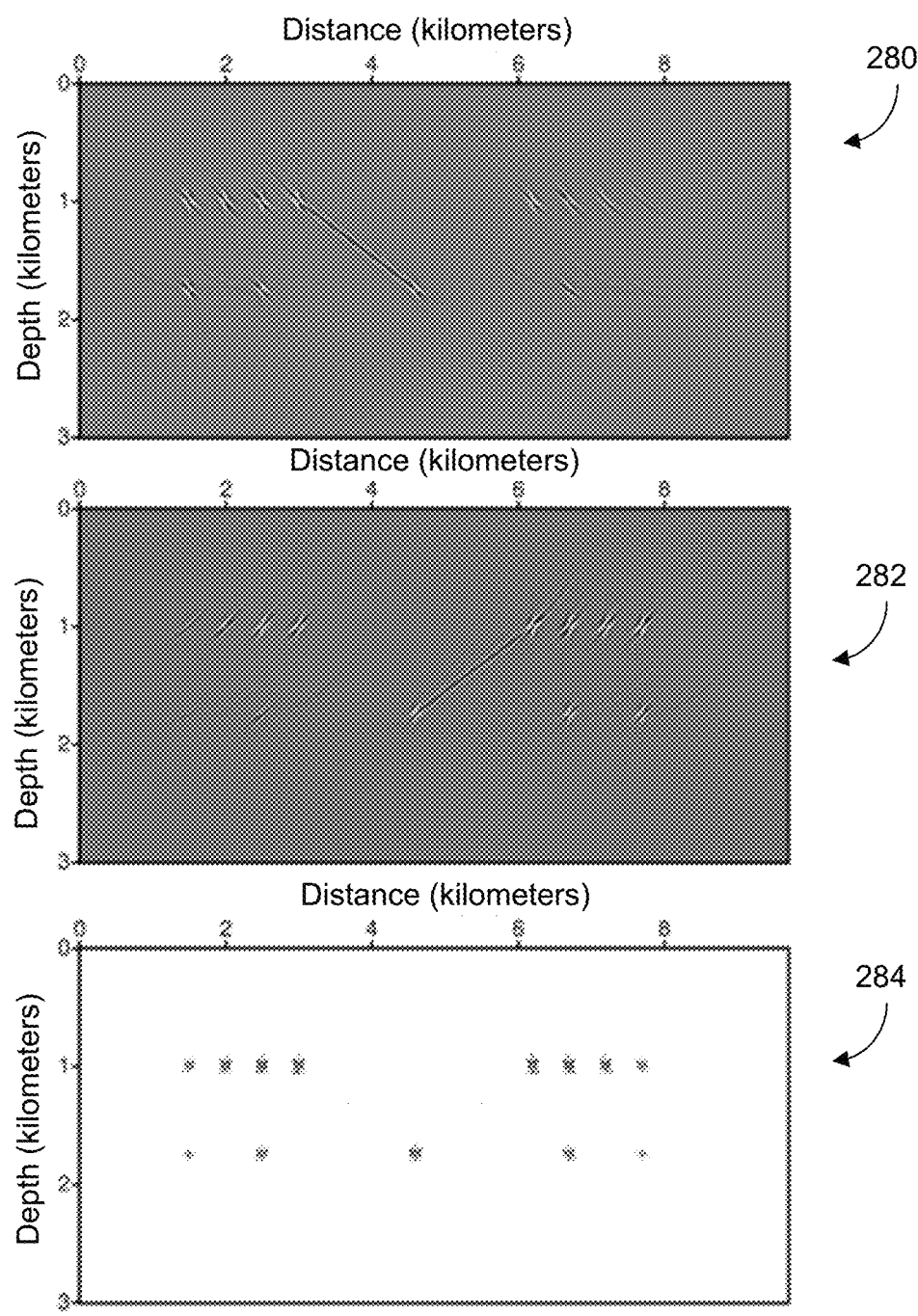
FIG. 7 illustrates a multiplication diffraction imaging condition using an image of the example structure of FIG. 6.

FIG. 7 illustrates a multiplication diffraction imaging condition using an image of the example structure of FIG. 6. Using the left-left imaging condition on the model of FIG. 6, the seismic imaging engine 252 obtains the positive-dip structure image 280. Similarly, the seismic imaging engine 252 determines a migration image with negative-dip structure and the scatterers as shown in image 282 by using the right-right imaging condition. After the seismic imaging engine 252 performs sample-by-sample multiplication of the two images (such as by multiplication module 260) generating an image 284 in which diffraction energy is enhanced. Generally, the multiplication imaging condition does not require any additional computation of prestack dip gathers to separate the diffraction energy in the migration images. Thus, the seismic imaging engine 252 uses this process for a practical and efficient way to obtain a diffraction image based on the wave-equation.

The data processing system 250 can use the left-left and right-right imaging conditions for positive-dip and negative-dip structure images and the Hilbert transform to separate the wavefields into left-down, right-down components for both source and receiver wavefields. The data processing system 250, using left-down source and receiver wavefields and right-down source and receiver wavefields, can obtain both positive-dip and negative-dip structure images. The data processing system 250 can use a Hilbert transform with respect to x and z to separate the wavefields into left and right propagation directions. The data processing system 250 can use a Hilbert transform with respect to t and z is used to separate the wavefields into up and down propagation directions. The wavefield separation into up and down directions adds an extra 66% computation cost relative to the two-way imaging condition described below. A one-way imaging condition followed is further described in relation to FIGS. 11-15. An analysis using the two-way imaging condition without up-down separation to image the positive-dip and negative-dip structures is further described in relation to FIGS. 16-20.

The one-way imaging condition for positive-dip and negative-dip structures with wavefield separation is now described. The data processing system 250 can use wavefield separation to obtain wavefields with specified propagation directions, which are used to remove migration artifacts and also recover information for small angles during reverse time migration angle gather generation. For example, the data processing system 250 can use wavefield separation with respect to t, z and x to calculate positive-dip and negative-dip structure images. Given a source wavefield and applying the Hilbert transform with respect to t, z and x, the source wavefield can be separated into right-down, left-down, right-up and left-up directions. For diffraction imaging, the data processing system 250 uses the right-down and left-down wavefields. The right-down propagating wavefield can be expressed in Equation (1):

$$S_{rd} = \frac{1}{8}\{S - \mathcal{H}_{tz}(S) - \mathcal{H}_{tx}(S) - \mathcal{H}_{xz}(S) + i[\mathcal{H}_t(S) + \mathcal{H}_z(S) + \mathcal{H}_x(S) - \mathcal{H}_{tzx}(S)]\}, \quad (1)$$

where $S_{rd}$ represents the right-down propagating source wavefield and S indicates the total source wavefield. $\mathcal{H}$ denotes the Hilbert transform and the subscripts t, z and x represent the variables where the Hilbert transform is applied. More details of the derivation are explained in Appendix A.

Further, the left-down propagating wavefield is defined in Equation (2):

$$S_{ld} = \frac{1}{8}\{S - \mathcal{H}_{tz}(S) + \mathcal{H}_{tx}(S) + \mathcal{H}_{xz}(S) + i[\mathcal{H}_t(S) + H_z(S) - \mathcal{H}_x(S) + \mathcal{H}_{tzx}(S)]\}. \quad (2)$$

Applying similar operations to the receiver wavefield, there are derived two directions of propagation are represented in Equations (3) and (4):

$$R_{rd} = \frac{1}{8}\{R - \mathcal{H}_{tz}(R) - \mathcal{H}_{tx}(R) - \mathcal{H}_{xz}(R) + i[\mathcal{H}_t(R) + \mathcal{H}_z(R) + \mathcal{H}_x(R) - \mathcal{H}_{tzx}(R)]\}, \quad (3)$$

$$R_{ld} = \frac{1}{8}\{R - \mathcal{H}_{tz}(R) + \mathcal{H}_{tx}(R) + \mathcal{H}_{xz}(R) + i[\mathcal{H}_t(R) + \mathcal{H}_z(R) - \mathcal{H}_x(R) + \mathcal{H}_{tzx}(R)]\}, \quad (4)$$

where, $R_{rd}$ and $R_{ld}$ represent the left-down and right-down propagating receiver wavefields, respectively, and R is the total receiver wavefield.

The data processing system 250 uses right-down propagating source and receiver wavefields (Equations 1 and 3) to image the structure with negative-dip reflectors and all potential diffractors, which represents the right-right image. The right-right imaging condition can be expressed in Equation (5):

$$I_{rr} = \text{Re}\left\{\int_0^{T_{max}} S_{rd} R_{rd} dt\right\} = \quad (5)$$

$$\frac{1}{64}\int_0^{T_{max}} \{[S - \mathcal{H}_{tz}(S) - \mathcal{H}_{tx}(S) - \mathcal{H}_{xz}(S)][R - \mathcal{H}_{tz}(R) - \mathcal{H}_{tx}(R) - \mathcal{H}_{xz}(R)] - [\mathcal{H}_t(S) + \mathcal{H}_z(S) + \mathcal{H}_x(S) - \mathcal{H}_{tzx}(S)][\mathcal{H}_t(R) + \mathcal{H}_z(R) + \mathcal{H}_x(R) - \mathcal{H}_{tzx}(R)]\}dt.$$

Similarly, the data processing system 250 uses the left-down propagating source and receiver wavefields (Equations 2 and 4) to image the positive-dip structure with all potential diffractors, which represent the left-left image. The left-left imaging condition can be expressed in Equation (6):

$$I_{ll} = \text{Re}\left\{\int_0^{T_{max}} S_{ld} R_{ld} dt\right\} = \quad (6)$$

$$\frac{1}{64}\int_0^{T_{max}} \{[S - \mathcal{H}_{tz}(S) + \mathcal{H}_{tx}(S) + \mathcal{H}_{xz}(S)][R - \mathcal{H}_{tz}(R) + \mathcal{H}_{tx}(R) + \mathcal{H}_{xz}(R)] - [\mathcal{H}_t(S) + \mathcal{H}_z(S) - \mathcal{H}_x(S) + \mathcal{H}_{tzx}(S)][\mathcal{H}_t(R) + \mathcal{H}_z(R) - \mathcal{H}_x(R) + \mathcal{H}_{tzx}(R)]\}dt.$$

The Hilbert transform with respect to time for both source and receiver wavefields generally requires two additional modeling operations. Compared to the computational cost of modeling, this makes the total computation cost for diffraction imaging is approximately 66% greater than a computation cost for the conventional reflection migration. Moreover, the separated wavefields only contain one-way (down-going) energy to image the subsurface which sometimes results in loss of useful signal and poor subsurface illumination. Conversely, the two-way diffraction imaging condition provides computing advantages to reduce or eliminate the added costs of performing diffraction imaging. Generally, the two-way diffraction imaging condition provides better illumination compared to the one-way imaging condition, as subsequently described.

The two-way imaging condition for positive-dip and negative-dip structures with wavefield separation now described is more efficient than the one-way method previously described.

Figure 8:
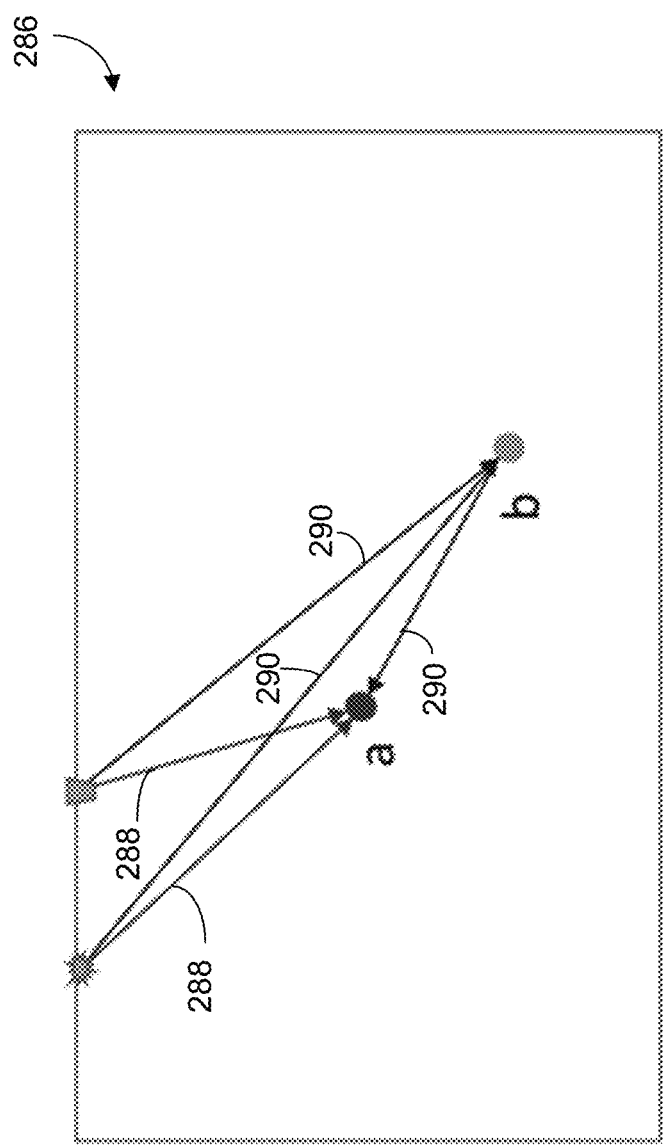
FIG. 8 illustrates an example sketch of a two-way diffraction imaging condition.

FIG. 8 illustrates an example sketch 286 of a two-way diffraction imaging condition. In this example, the down-going waves represented by arrows 288 are used to image the diffractor point "a." The wavefields actually contain two components of down-going and up-going waves. Besides the down-going wave, the up-going wave is also useful and important for imaging. The up-going wave can enhance the diffraction image and provide wider illumination because it can reach areas where the down-going wave does not. The up-going wave indicated by the arrows 290 in FIG. 8 can also contribute to the diffraction image of the point "a." The seismic imaging engine 252 of the data processing system 250 takes advantage of this by using both down-going and up-going waves for diffraction imaging.

Similar to the derivation of the one-way imaging condition for positive-dip and negative-dip structures, if up-down separation is not considered, the Hilbert transform with respect to the time is not required, saving substantial processing time. Using a Hilbert transform with respect horizontal x and depth z, the wavefields can be decomposed into right-down/left-up and left-down/right-up directions. The right-down/left-up wavefields include right-down and left-up propagation directions. The left-down/right-up wavefields include left-down and right-up propagating wavefields. The combination of two directions avoids using Hilbert transform with respect to time which can save one forward modeling operation. Given a source wavefield, applying the Hilbert transform over x and z, the right-down/left-up wavefields can be expressed in Equation (7):

$$S_{rdlu} = S_{rd} + S_{lu} = \frac{1}{8}\mathcal{E}_x^+\{\mathcal{E}_z^+[\mathcal{E}_t^+(S)]\} + \frac{1}{8}\mathcal{E}_x^+\{\mathcal{E}_z^+[\mathcal{E}_t^-(S)]\} = \quad (7)$$

$$\frac{1}{4}\mathcal{E}_x^+[\mathcal{E}_z^+(S)] = \frac{1}{4}\{S - H_{xz}(S) + i[H_z(S) + H_x(S)]\},$$

where, $\mathcal{E}_x^+\{\mathcal{E}_z^+[\mathcal{E}_t^+(S)]\}$ represents the right-down-going wave and $\mathcal{E}_x^+\{\mathcal{E}_z^+[\mathcal{E}_t^-(S)]\}$ is the left-up-going wave.

The left-down/right-up wavefields can be expressed in Equation (8):

$$S_{ldru} = S_{ld} + S_{ru} = \frac{1}{8}\mathcal{E}_x^-\{\mathcal{E}_z^+[\mathcal{E}_t^+(S)]\} + \frac{1}{8}\mathcal{E}_x^-\{\mathcal{E}_z^+[\mathcal{E}_t^-(S)]\} = \quad (8)$$

$$\frac{1}{4}\mathcal{E}_x^-[\mathcal{E}_z^+(S)] = \frac{1}{4}\{S + \mathcal{H}_{xz}(S) + i[\mathcal{H}_z(S) - \mathcal{H}_x(S)]\},$$

where, $\mathcal{E}_x^-\{\mathcal{E}_z^+[\mathcal{E}_t^+(S)]\}$ represents the left-down-going wave and $\mathcal{E}_x^-\{\mathcal{E}_z^+[\mathcal{E}_t^-(S)]\}$ is the right-up-going wave. Applying the same Hilbert transform to the receiver wavefields, the two components of the receiver wavefields can be defined in Equations (9) and (10):

$$R_{rdlu} = R_{rd} + R_{lu} = \frac{1}{8}\mathcal{E}_x^+\{\mathcal{E}_z^+[\mathcal{E}_t^+(R)]\} + \frac{1}{8}\mathcal{E}_x^+\{\mathcal{E}_z^+[\mathcal{E}_t^-(R)]\} = \quad (9)$$

$$\frac{1}{4}\mathcal{E}_x^+[\mathcal{E}_z^+(R)] = \frac{1}{4}\{R - \mathcal{H}_{xz}(R) + i[\mathcal{H}_z(R) + \mathcal{H}_x(R)]\},$$

$$R_{ldru} = R_{ld} + R_{ru} = \frac{1}{8}\mathcal{E}_x^-\{\mathcal{E}_z^+[\mathcal{E}_t^+(R)]\} + \frac{1}{8}\mathcal{E}_x^-\{\mathcal{E}_z^+[\mathcal{E}_t^-(R)]\} = \quad (10)$$

$$\frac{1}{4}\mathcal{E}_x^-[\mathcal{E}_z^+(R)] = \frac{1}{4}\{R + \mathcal{H}_{xz}(R) + i[\mathcal{H}_z(R) - \mathcal{H}_x(R)]\}.,$$

where $R_{rdlu}$ and $R_{ldru}$ represent the right-down/left-up and left-down/right-up receiver wavefields, respectively.

Similar to the one-way image condition of positive-dip and negative-dip structures, we can use the decomposed two-way wavefields to derive the imaging condition of the two opposite dip structures. Using Equations 8 and 10, the positive-dip imaging condition can be expressed in Equation (11):

$$I_{pd} = \text{Re}\left\{\int_0^{T_{max}} S_{ldru}R_{ldru}dt\right\} = \quad (11)$$

$$\frac{1}{16}\int_0^{T_{max}}\{[S + \mathcal{H}_{xz}(S)][R + \mathcal{H}_{xz}(R)] - [\mathcal{H}_z(S) - \mathcal{H}_x(S)][\mathcal{H}_z(R) - \mathcal{H}_x(R)]\}dt.$$

This imaging condition can image all positive-dip structures and potential diffractors. Using Equations 7 and 9, the negative-dip imaging condition can be defined in Equation (12):

$$I_{nd} = \text{Re}\left\{\int_0^{T_{max}} S_{rdlu}R_{rdlu}dt\right\} = \quad (12)$$

$$\frac{1}{16}\int_0^{T_{max}}\{[S - \mathcal{H}_{xz}(S)][R - \mathcal{H}_{xz}(R)] - [\mathcal{H}_z(S) + \mathcal{H}_x(S)][\mathcal{H}_z(R) + \mathcal{H}_x(R)]\}dt$$

which can image all negative-dip structures and possible diffractors. In contrast to Equations 5 and 6, Equations 11 and 12 do not require a Hilbert transform with respect to time t, which saves significant computation cost.

The impulse response analysis is now described. The positive-dip and negative-dip imaging conditions are derived based on one-way and two-way methodologies. To visually represent the difference of these two imaging conditions, impulse response tests are conducted to show the different components of the image.

Figure 9:
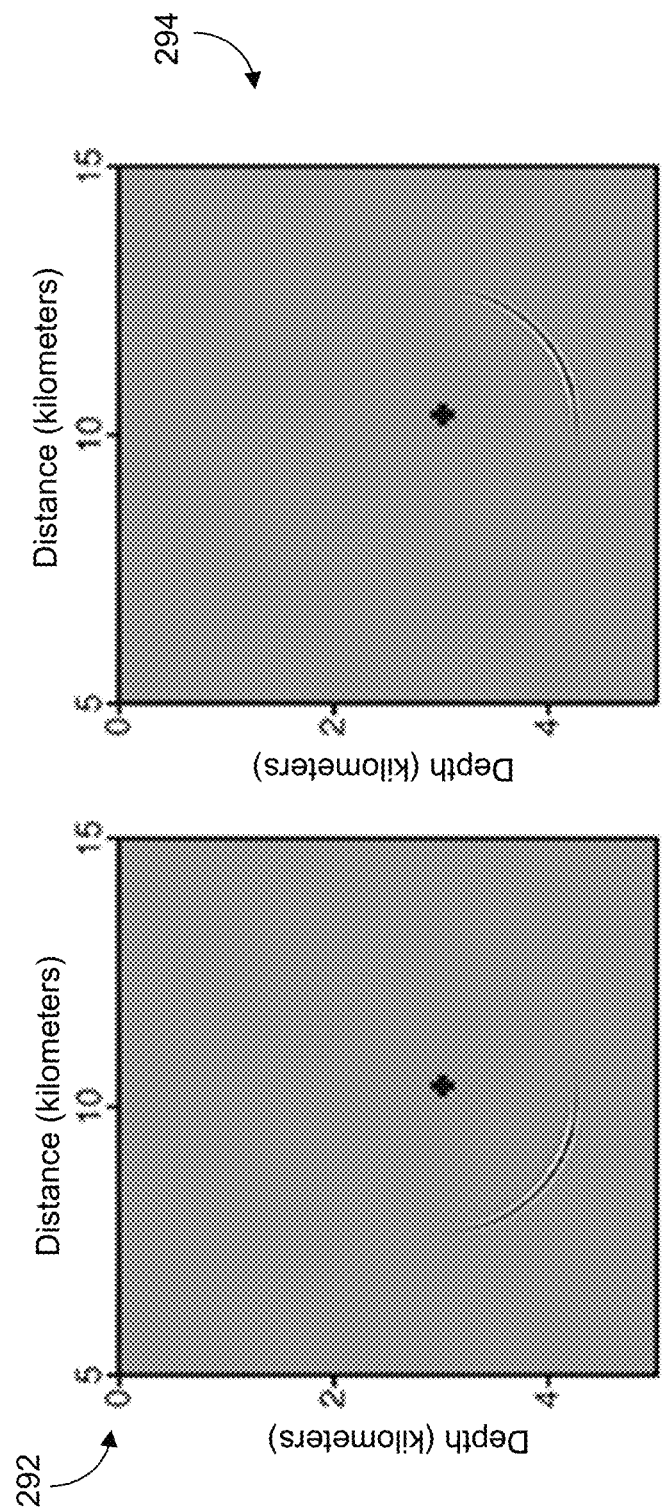
FIGS. 9-10 illustrate examples of an impulse responses of imaging conditions.

FIG. 9 shows an impulse response of a one-way imaging condition applied by the seismic imaging engine 252 is shown. The source and receiver are located in the middle of the model indicated by the cross images 292 and 294 so that the full impulse response. The model is a constant velocity with one trace containing one wavelet as an input. If no wavefield separation is applied, the impulse response should be a full circle. With the different wavefield separations, different parts of a circle will be imaged accordingly. Image 292 shows the impulse response of the left-left imaging condition applied by the seismic imaging engine 252. Because only the left-down-going source and receiver wavefields are used, one quarter of circle represented by the positive-dip structure is imaged. Image 294 shows the impulse response of right-right imaging condition applied by the seismic imaging engine 252 by using right-down-going source and receiver wavefields. This impulse response represents the dip of structure from −90° to 0°, which indicates the right-right image condition can image the negative-dip structure.

Figure 10:
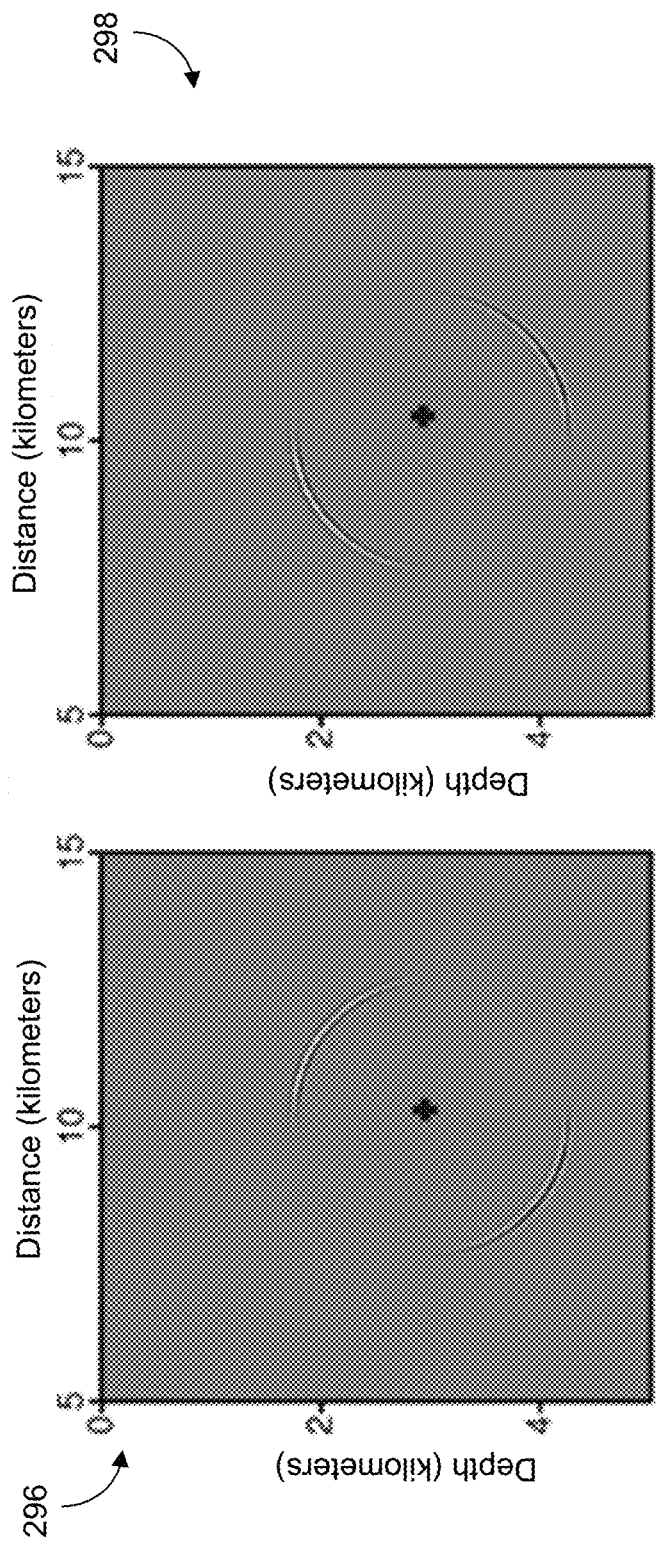

Turning to FIG. 10, an impulse response of two-way positive and negative-dip imaging condition applied by the seismic imaging engine 252, respectively, are shown in the left image 296 and the right image 298. The impulse response using a positive-dip imaging condition comprises two parts. The left-down component is the same as the impulse response of the one-way left-left imaging condition. The additional right-up component is generated by the zero-lag cross-correlation of right-up-going source and receiver waves. Although left-down-going waves and right-up-going waves can generate the image independently, both images represent the positive-dip structure. This is the reason why up-down separation is not necessarily required for the wavefield separation. Similarly, the impulse response using a negative-dip imaging condition comprises right-down and left-up components. The right-down component is same as that of the one-way right-right imaging condition, and the left-up component is generated by the left-up-going source and receiver wavefields. Both of these components represent the negative-dip structure. Compared to the impulse response of the one-way imaging condition, the impulse response of the two-way imaging condition includes the additional up-going components. These can increase illumination and subsequently enhance the final diffraction image generated by the seismic imaging engine 252.

In the following examples, the data processing system 250 applies the one-way and two-way imaging conditions to generate positive-dip and negative-dip structure images. The seismic imaging engine 252 of the data processing system 250 multiplies the structure images (such as by multiplication module 260) to generate a diffraction image for each of 2D synthetic and field data sets. The results, shown in FIGS. 11-20, demonstrate that the two-way positive-dip and negative-dip imaging condition can provide broader illumination and enhance the diffraction image compared to the one-way imaging condition. Additionally, using the two-way imaging condition, the data processing system 250 reduces computation cost by 40% compared to using a one-way imaging condition by not having to compute the Hilbert transform with respect to time.

Figure 11:
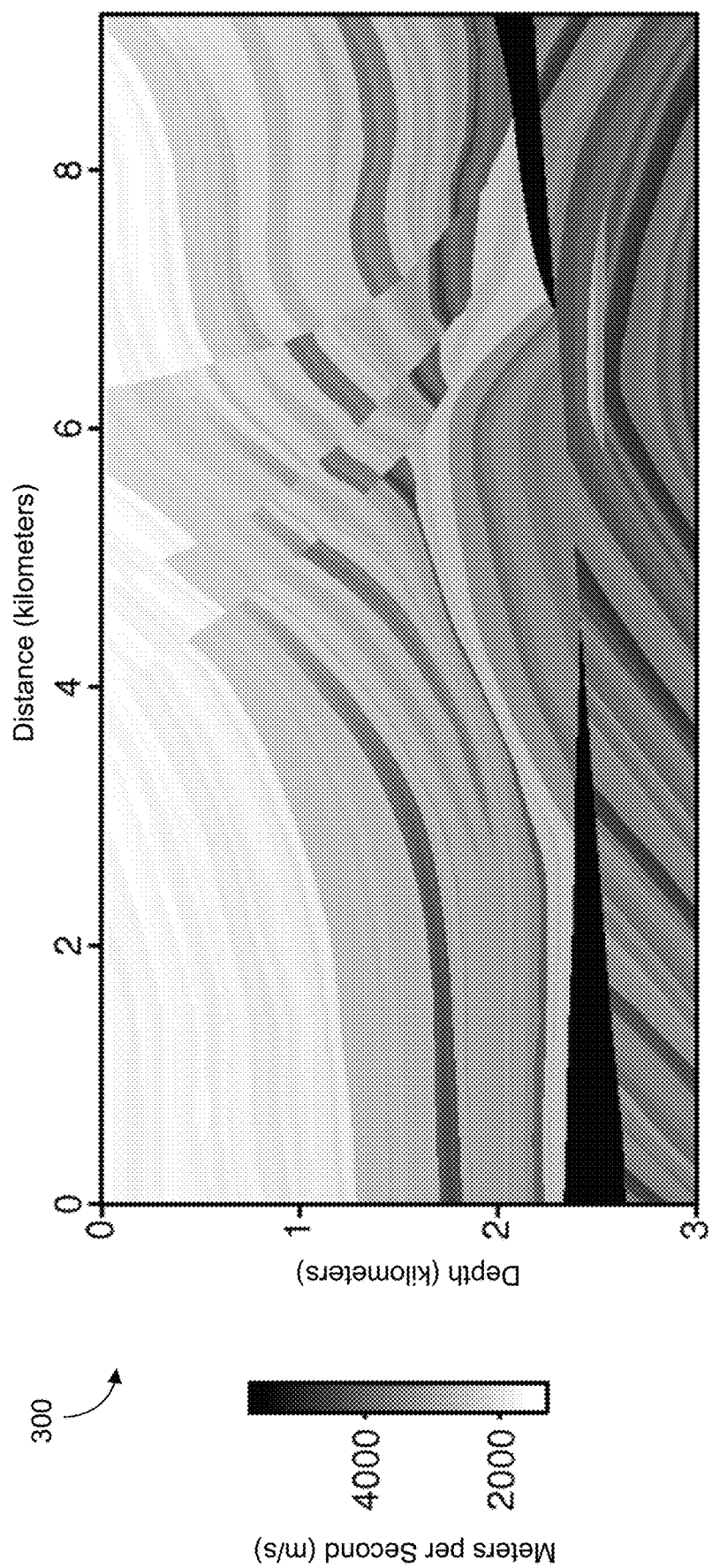
FIG. 11 shows an example of a velocity model representing synthetic geological features of a synthetic subterranean formation.

FIG. 11 shows an example of a velocity model 300 representing synthetic geological features of a synthetic subterranean formation. The first synthetic example tested is a Marmousi model. The Marmousi model comprises faults, pinch-outs and curved and planar dipping reflectors. Each shade represented in the model 300 represents a different velocity for wave propagation. This model is an example to demonstrate the new wave-equation based diffraction imaging method and illustrate the difference between two-way and one-way imaging conditions. The horizontal and depth grid intervals of the Marmousi model is 5 meters (m). The acquisition comprises 450 single-sided shot gathers that are generated with a shot interval of 20 meters, receiver interval of 20 meters, and a maximum offset of 4 kilometers (km). The peak frequency of the data is 20 Hertz (Hz).

Figure 12:
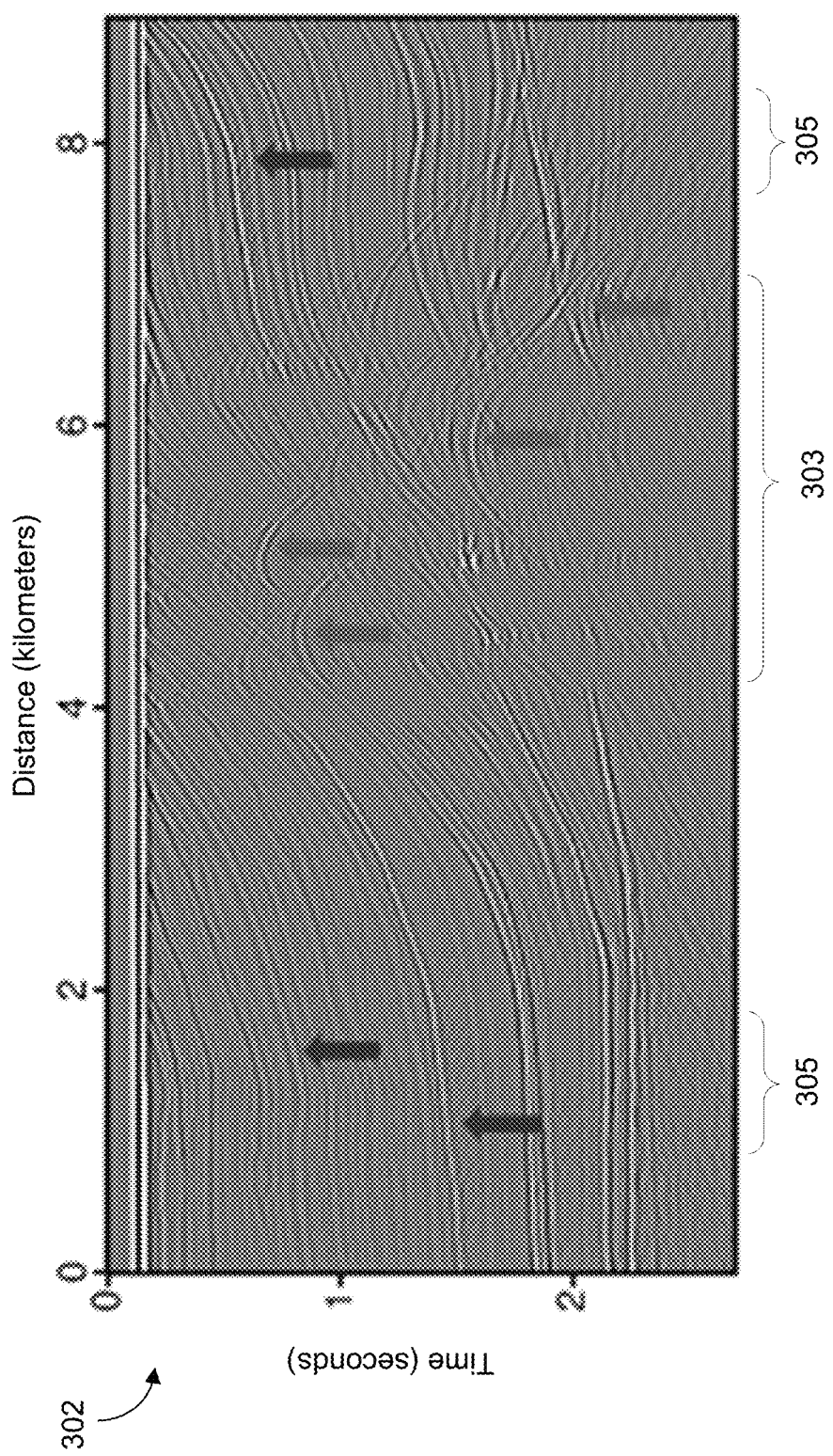
FIG. 12 shows an example of diffraction data from a common-offset gather for the features of FIG. 11.
Figure 13:
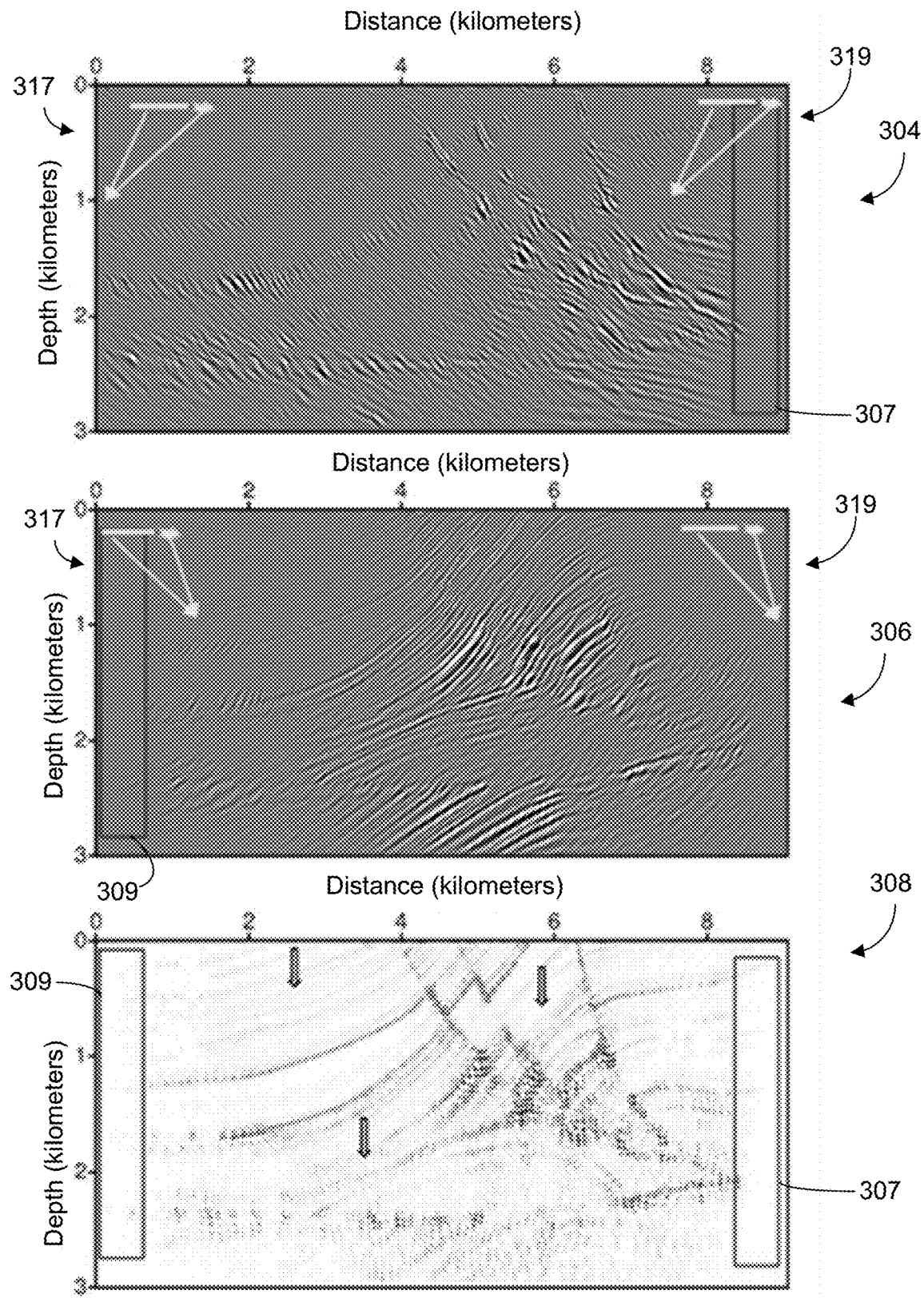
FIG. 13 shows examples of diffraction images using a one-way imaging condition for the synthetic features of FIG. 11.

Turning to FIG. 12, an example of diffraction data from a common-offset gather for the subterranean formation of FIG. 11 is shown. The image 302 shows a common-offset profile. Diffractions from faults and pinch-outs, indicated by the arrows 303, are visible while energy of the diffractions generated by coarse grid spatial sampling of dipping layers (denoted by the arrows 305) is very weak. The true velocity model for migration is used in this test. Arrows 303 indicate strong diffractions from faults and pinch-outs. Arrows 305 denote weak diffractions from the staircase points due to the coarse finite difference grid mesh along dipping reflectors FIG. 13 shows examples of diffraction images using a one-way imaging condition for the synthetic features of FIG. 11. Image 304 includes a positive-dip structure image, and image 306 includes a negative-dip structure image. The flat line and the associated star represent the receiver array 317 and source geometry 319 in these locations. The yellow arrows denote the left-down- and right-down-going ray paths. The positive-dip structure image 304 is generated by the seismic imaging engine 252 using a one-way left-left imaging condition. The negative-dip structure image is generated by the seismic imaging engine 252 using a one-way right-right imaging condition. The seismic imaging engine 252 generates a diffraction image 308 by applying the sample-by-sample multiplication diffraction imaging condition using the data from image 304 and image 306. As seen in image 308, reflection energy is attenuated and only the diffractions are enhanced, including those from faults, pinch-outs, and the isolated finite difference mesh grid point scatterers. Because of the one-way imaging condition and single sided receiver array with sources located at the right side of the array, the positive-dip structure image using left-left imaging condition shown in image 304 can only illuminate the left edge of the Marmousi model as indicated by the box 307. The left-down ray path from source and receiver in image 304 can reach the area of left edge; however, they cannot arrive at the right side edge of the model. Similarly in image 306, the right-down ray path from sources and receivers can only reach the right side edge of the model, and not box 309. Therefore, the multiplication diffraction based image shown in image 308 fails to illuminate both edges 307, 309 of the final section.

Figure 14:
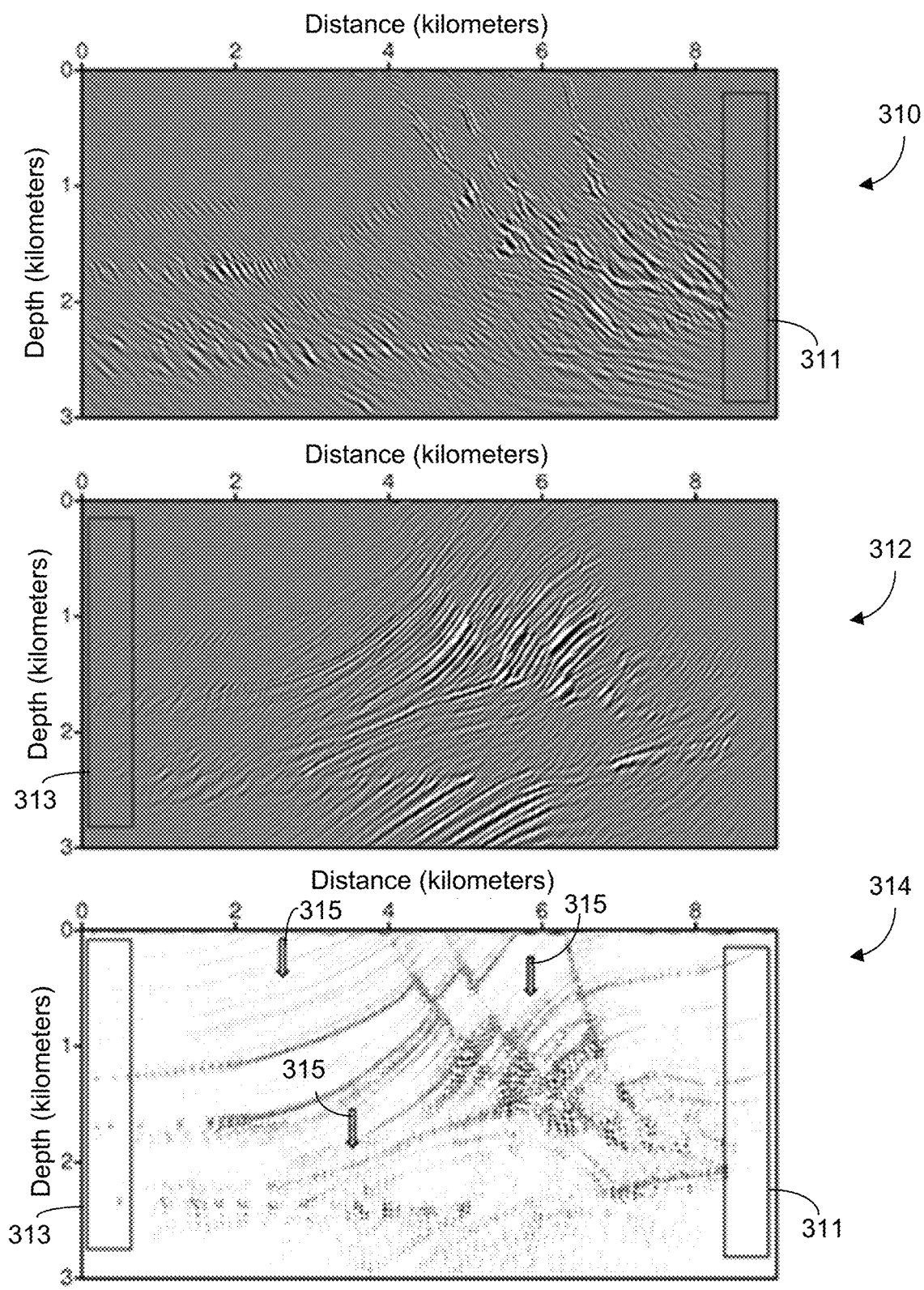
FIG. 14 shows examples of diffraction images using a two-way imaging condition for the synthetic features of FIG. 11.

FIG. 14 shows examples of diffraction images using a two-way imaging condition for the synthetic features of FIG. 11. Image 310 is the positive-dip structure image. Image 312 is the negative-dip structure image. Each image 310, 312 is obtained by the seismic imaging engine 252 by applying the two-way imaging condition previously described. Compared with image 304 and image 306, which show the structure images resulting from the one-way imaging condition, the illumination of two-way images is not limited by the off-end acquisition geometry. Rather, both sides of the section are equally illuminated regardless of whether the seismic imaging engine 252 images the positive-dip or negative-dip structures, as shown by left box 313 and right box 311. There, the final diffraction image 314 has broader illumination than the one using a one-way imaging condition shown in image 308 of FIG. 13. Due to the contribution of the up-going wave in the two-way imaging condition, the diffraction image is enhanced in some areas as indicated by the arrows 315.

Figure 15:
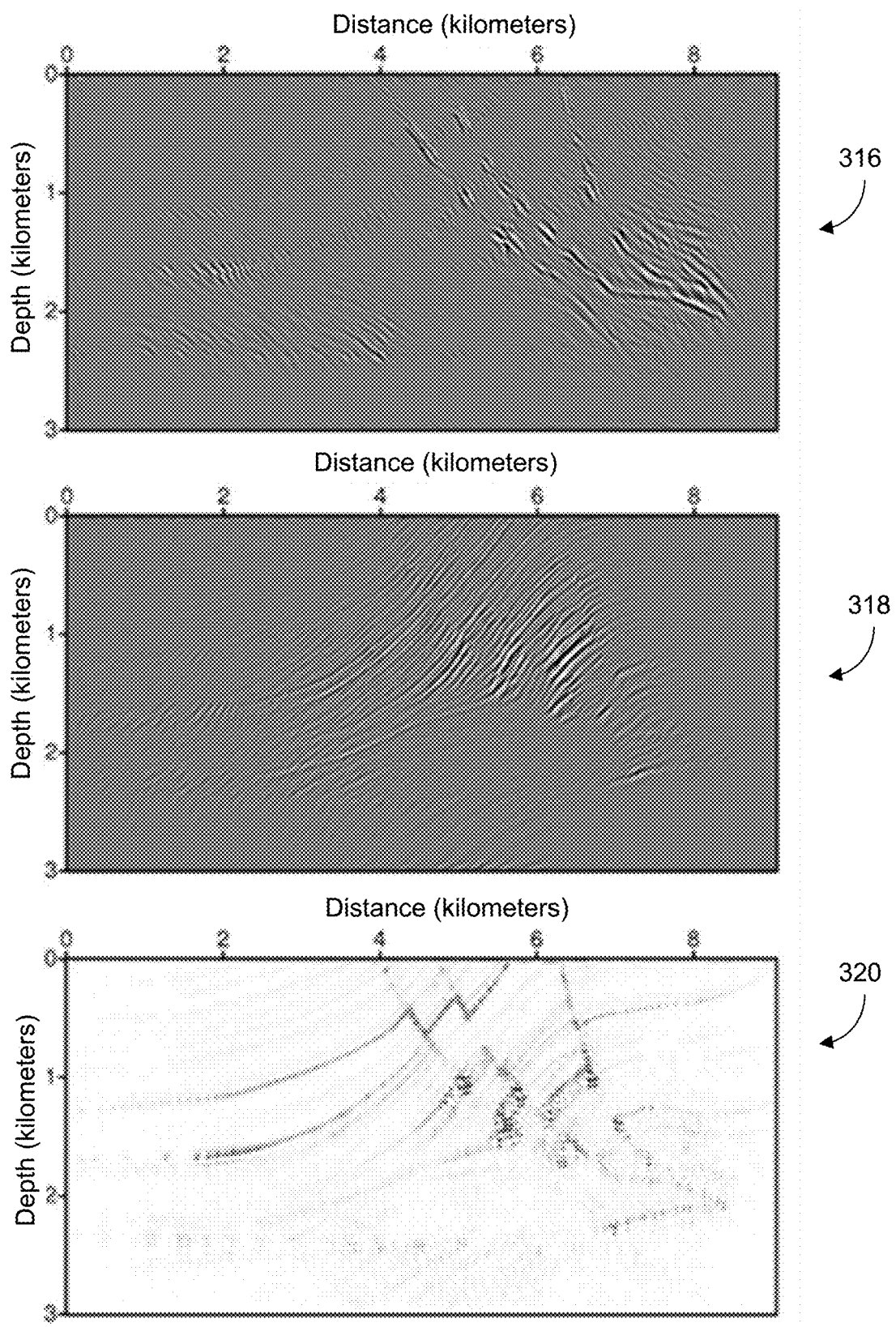
FIG. 15 shows a comparison of the images of FIGS. 13-14.

FIG. 15 shows a comparison of the images of FIGS. 13-14. Image 316 shows the difference between image 304 using one-way imaging condition and image 310 using the two-way imaging condition including the positive-dip structure image. Image 318 shows the difference between image 306 using one-way imaging condition and image 312 using the two-way imaging condition including the negative-dip structure image. Image 320 shows the difference between image 308 using one-way imaging condition and image 314 using the two-way imaging condition including the final diffraction image. The major reason for such a difference shown in image 320 is from the up-going wavefield.

Figure 16:
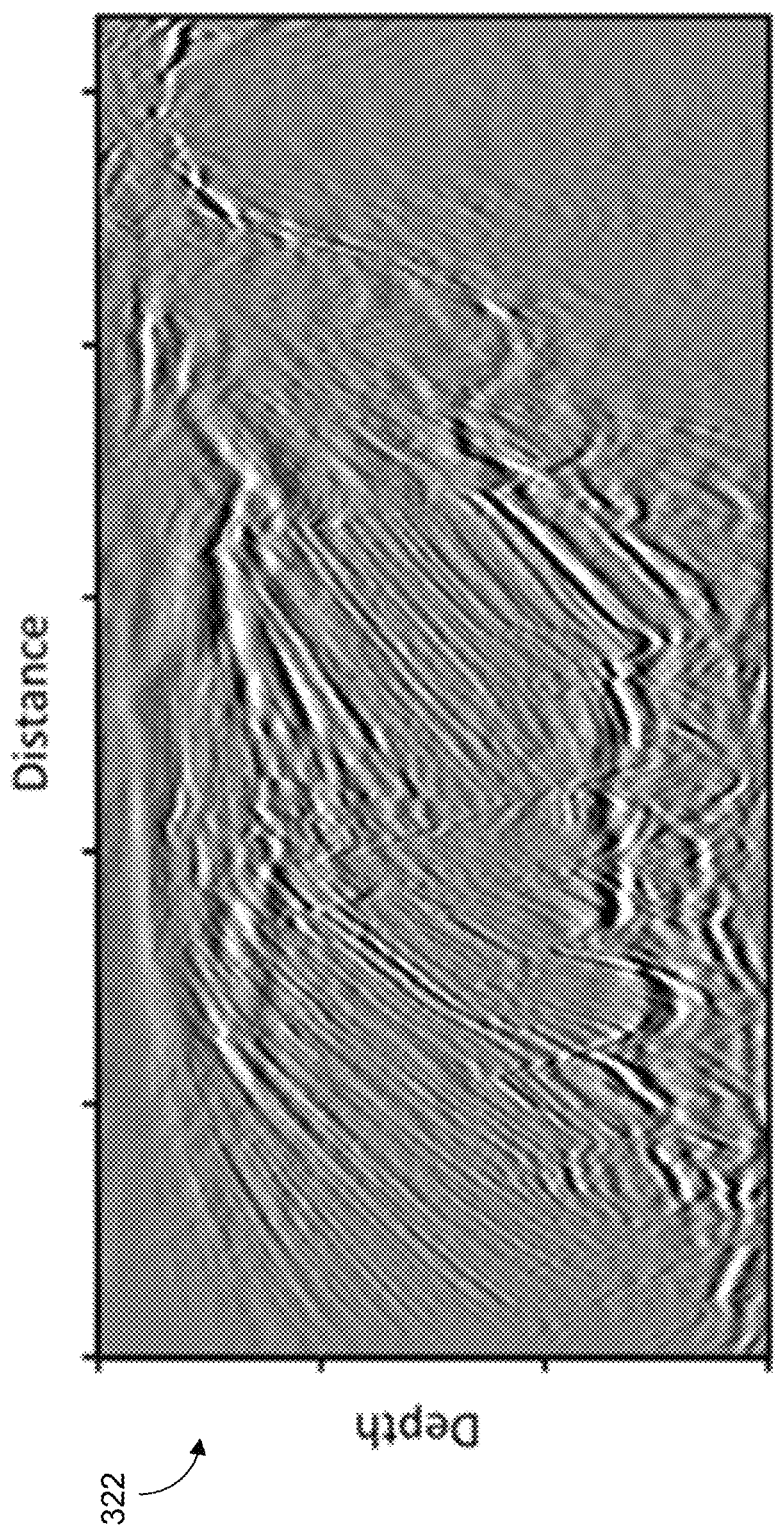
FIG. 16 shows diffraction images of geological features of a subterranean formation.
Figure 17:
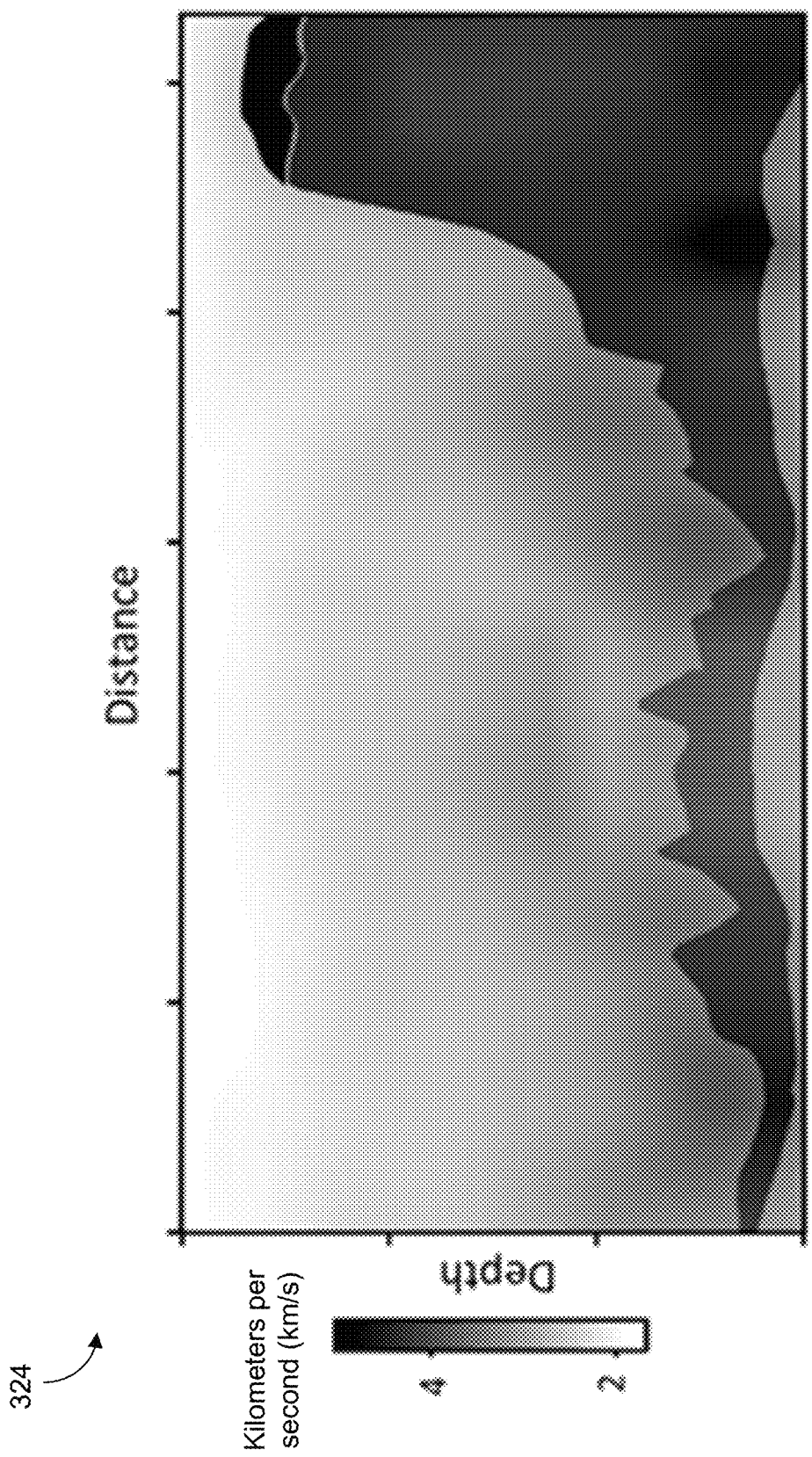
FIG. 17 shows an example of a velocity model representing the geological features of the subterranean formation of the images of FIG. 16.

The data processing system 250 applies the one-way and two-way imaging conditions by the seismic imaging engine 252 on field data acquired from a transition zone seismic dataset. The image 322 from field data is shown in FIG. 16. FIG. 16 shows diffraction images of geological features of a subterranean formation. FIG. 17 shows an example of a velocity model 324 representing the geological features of the subterranean formation of the images of FIG. 16. The acquisition geometry comprises 450 single-sided shot gathers with a shot interval of 20 meters, receiver interval of 20 meters and a maximum offset of 4 kilometers. The peak frequency of the data is 30 Hertz. The conventional wave-equation based migration image 322 contains both reflection and diffraction energy by using migration velocity model 324 shown in FIG. 17.

Figure 18:
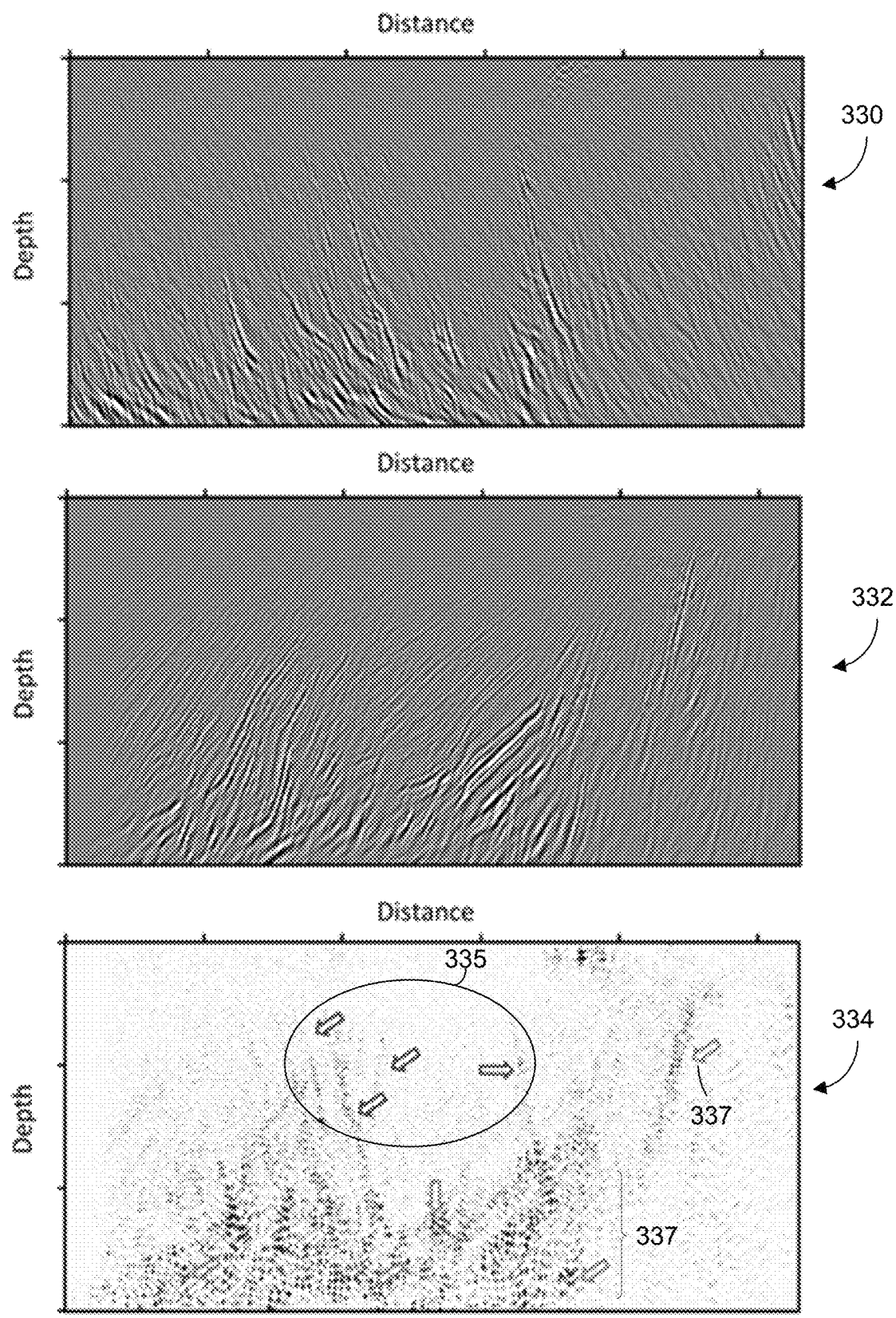
FIG. 18 shows examples of diffraction images using a one-way imaging condition for the features of FIG. 16.

FIG. 18 shows examples of diffraction images using a one-way imaging condition for the features of FIG. 16. Image 330 comprises the positive-dip structure image. Image 332 comprises the negative-dip structure image. Here, the images 330, 332 are generated by the seismic imaging engine 252 utilizing the one-way imaging condition previously described. After seismic imaging engine 252 multiplies the two opposite dip structure image components, the corresponding final diffraction image 334 is generated by the diffraction rendering module 262. The diffraction image 334 indicates the location of the faults (indicated by the arrows 335) which can be easily verified and correlated with the image obtained from conventional migration shown in FIG. 16. The arrows 337 point to discontinuities in the reflection events.

Figure 19:
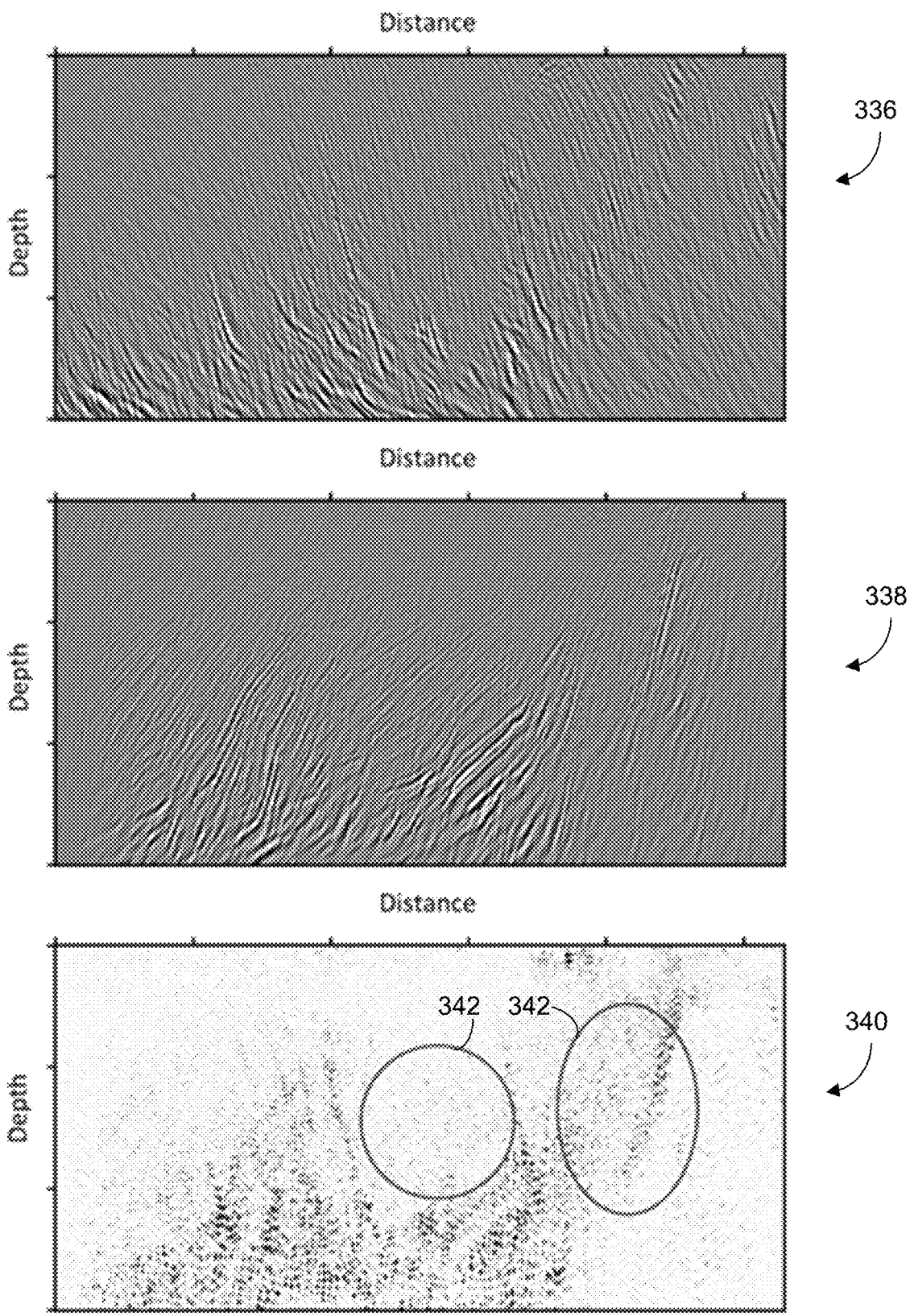
FIG. 19 shows examples of diffraction images using a two-way imaging condition for the features of FIG. 16.

FIG. 19 shows examples of diffraction images using a two-way imaging condition for the features of FIG. 16. The seismic imaging engine 252 generates the positive-dip image 336 and generates the negative-dip structure image 338 resulting from using the two-way imaging condition. The seismic imaging engine 252 generates the final diffraction image 340, which shows similar fault locations and reflection discontinuities to the image 334 generated by the one-way imaging condition of FIG. 18. Additionally, the whole diffraction image is enhanced, especially in the circled areas 342 shown in image 340 because of the contribution of the up-going wave part of the wavefield. The circled areas 342 indicate the enhanced diffraction image by the up-going wavefield when compared with the image 334 of FIG. 18 generated by the one-way imaging condition.

Figure 20:
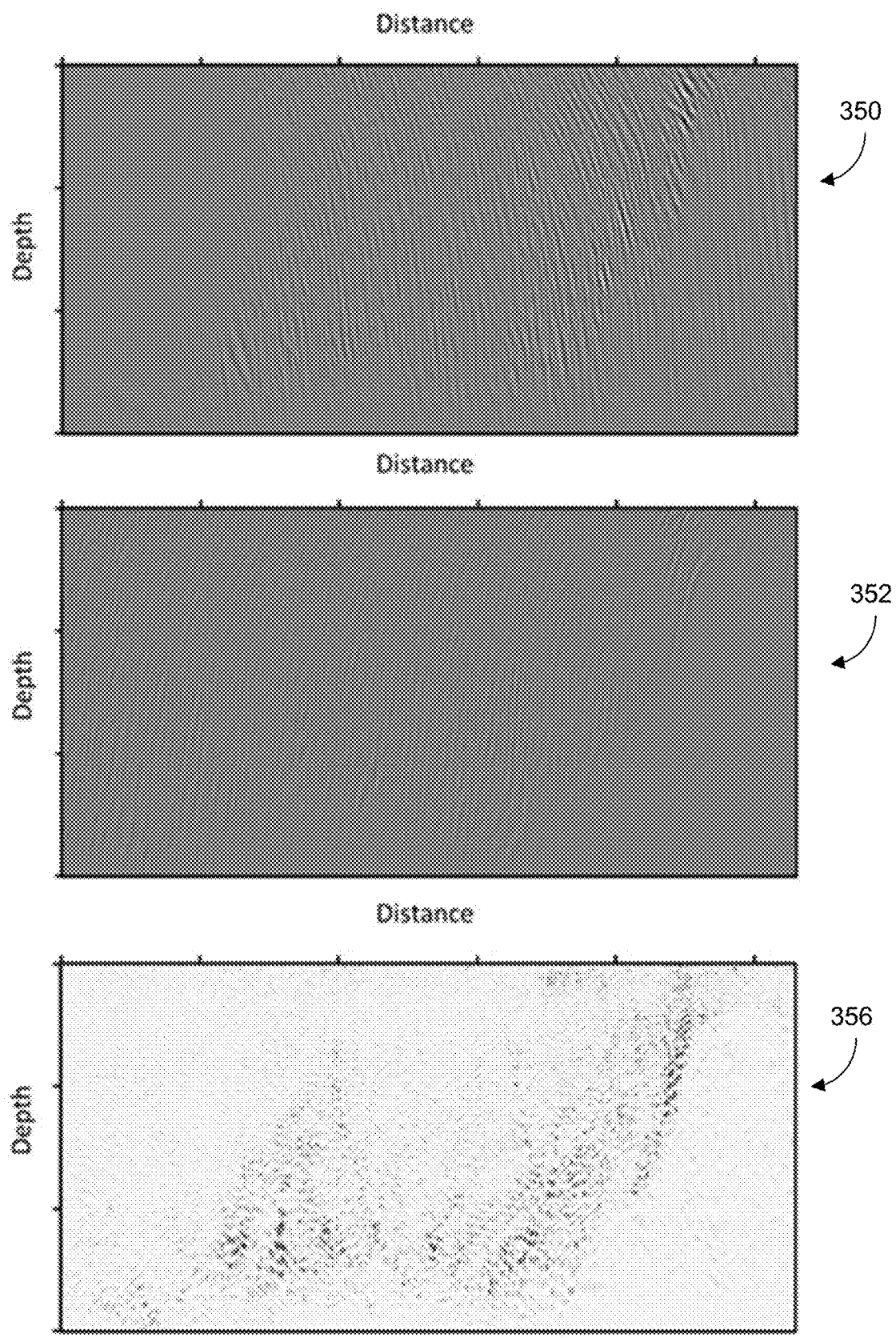
FIG. 20 shows a comparison of the images of FIGS. 18-19.

FIG. 20 shows a comparison of the images of FIGS. 18-19. Image 350 shows the difference of the positive-dip images 330 and 336 obtained by one-way and two-way imaging conditions, respectively. Image 352 shows the difference of the negative-dip structure images 332 and 338 obtained by one-way and two-way imaging conditions, respectively. The corresponding difference of the final diffraction is shown in image 356. The major reason for such a difference is contributed to the up-going wavefield. In other words, FIG. 20 depicts the images generated by the up-going wavefield and FIG. 18 shows the images generated by the down-going wavefield. Because the transmission coefficient is usually larger than the reflection coefficient, the down-going wave has a greater contribution to the final diffraction image than the up-going wave. However, the contribution from the up-going wave is still useful to improve the diffraction image.

Figure 21:
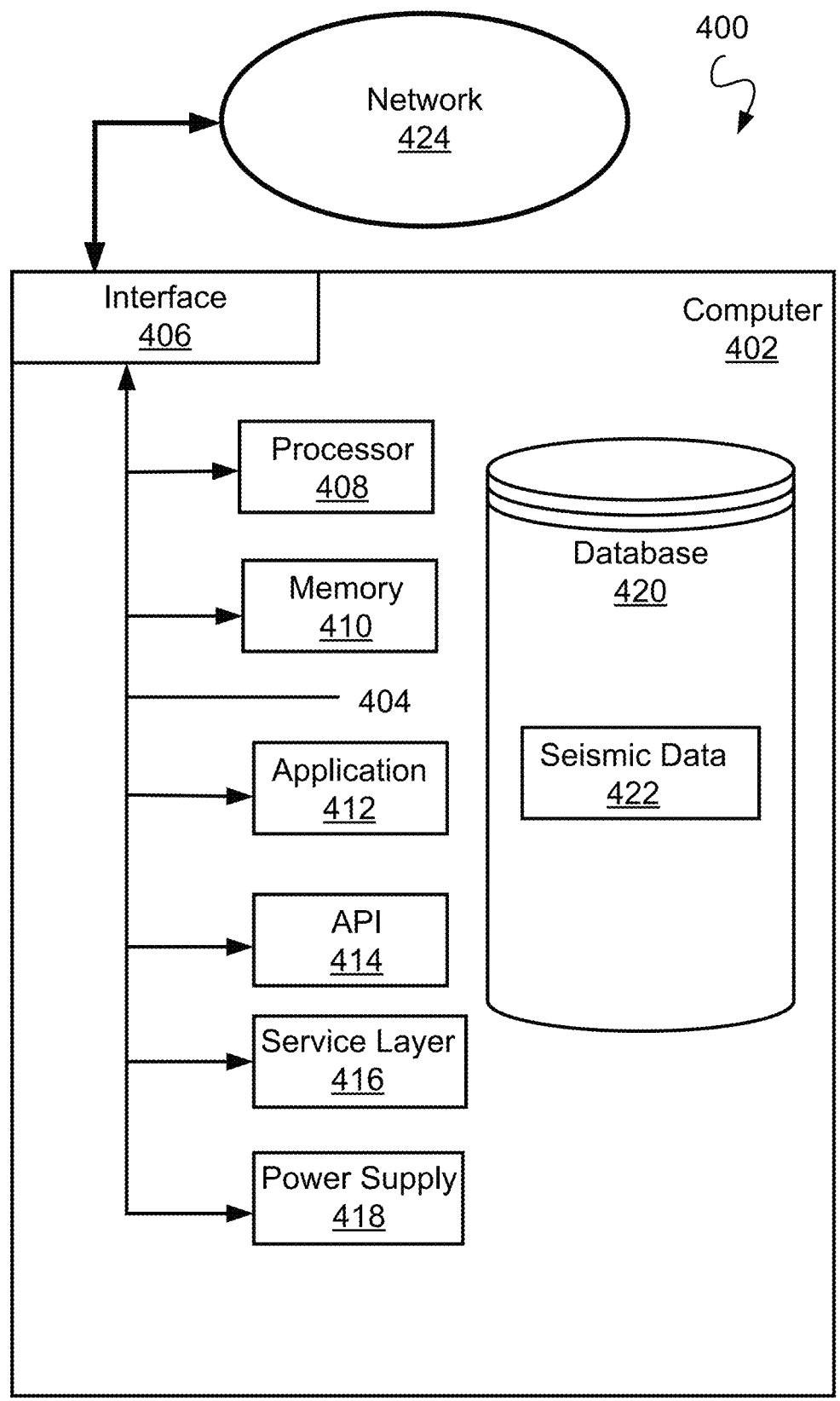
FIG. 21 is a diagram of an example computing system.

FIG. 21 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 21, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 21, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 21, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 21, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure.

Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A system for seismic imaging of a subterranean geological formation, the system comprising:
   at least one processor; and
   a memory storing instructions that, when executed by the at least one processor, cause the at least one processor to:
      generate a source wavefield from seismic data, acquired by a seismic receiver, the source wavefield representing a subterranean formation;
      generate a receiver wavefield from the seismic data, acquired by the seismic receiver, the receiver wavefield representing the subterranean formation;
      decompose the source wavefield into a source left-down/ right-up component and a source right-down/ left-up component;
      decompose the receiver wavefield into a receiver left-down/right-up component and a receiver right-down/ left-up component;
      apply an inner product of the source left-down/right-up component and the receiver left-down/right-up component to generate a positive-dip imaging condition;
      apply an inner product of the source right-down/left-up component and the receiver right-down/left-up component to generate a negative-dip imaging condition;
      multiply the positive-dip imaging condition with the negative-dip imaging condition to generate a diffraction-enhanced seismic image; and
      render the diffraction-enhanced seismic image for presentation on a user interface.

2. The system of claim 1, wherein generating the diffraction-enhanced seismic image is independent from separating reflection portions from diffraction portions of the seismic data.

3. The system of claim 1, wherein generating the diffraction-enhanced seismic image in reduces a computation cost by at least 40% relative to a computation cost of generating the diffraction-enhanced seismic image independent from multiplying the positive-dip imaging condition and the negative-dip imaging condition.

4. The system of claim 1, wherein the diffraction-enhanced seismic image comprises an increased field of illumination with respect to a seismic image generated independent from multiplying the positive-dip imaging condition and the negative-dip imaging condition.

5. The system of claim 1, wherein decomposing each of the source wavefield and the receiver wavefield comprises a Hilbert transform with respect to an axis parallel to a surface of the subterranean geological formation and an axis orthogonal to the surface of the subterranean geological formation.

6. The system of claim 1, wherein an up-going component of each of the source wavefield and the receiver wavefield is oriented toward a surface of the subterranean geological formation, and wherein a down-going component of each of the source wavefield and the receiver wavefield is oriented away from the surface of the subterranean geological formation.

7. A method for seismic imaging of a subterranean geological formation, the method comprising:
  generating a source wavefield from seismic data, acquired by a seismic receiver, the source wavefield representing a subterranean formation;
  generating a receiver wavefield from the seismic data, acquired by the seismic receiver, the source wavefield representing the subterranean formation;
  decomposing the source wavefield into a source left-down/ right-up component and a source right-down/ left-up component;
  decomposing the receiver wavefield into a receiver left-down/right-up component and a receiver right-down/ left-up component;
  applying an inner product of the source left-down/right-up component and the receiver left-down/right-up component to generate a positive-dip imaging condition;
  applying an inner product of the source right-down/left-up component and the receiver right-down/left-up component to generate a negative-dip imaging condition;
  multiplying the positive-dip imaging condition with the negative-dip imaging condition to generate a diffraction-enhanced seismic image; and
  rendering the diffraction-enhanced seismic image for presentation on a user interface.

8. The method of claim 7, wherein generating the diffraction-enhanced seismic image is independent from separating reflection portions from diffraction portions of the seismic data.

9. The method of claim 7, wherein generating the diffraction-enhanced seismic image in reduces a computation cost by at least 40% relative to a computation cost of generating the diffraction-enhanced seismic image independent from multiplying the positive-dip imaging condition and the negative-dip imaging condition.

10. The method of claim 7, wherein the diffraction-enhanced seismic image comprises an increased field of illumination with respect to a seismic image generated independent from multiplying the positive-dip imaging condition and the negative-dip imaging condition.

11. The method of claim 7, wherein decomposing each of the source wavefield and the receiver wavefield comprises a Hilbert transform with respect to an axis parallel to a surface of the subterranean geological formation and an axis orthogonal to the surface of the subterranean geological formation.

12. The method of claim 7, wherein an up-going component of each of the source wavefield and the receiver wavefield is oriented toward a surface of the subterranean geological formation, and wherein a down-going component of each of the source wavefield and the receiver wavefield is oriented away from the surface of the subterranean geological formation.

13. One or more non-transitory computer readable media storing instructions that are executable by one or more processors configured to perform operations for seismic imaging of a subterranean geological formation, the operations comprising:
  generating a source wavefield from seismic data, acquired by a seismic receiver, the source wavefield representing a subterranean formation;
  generating a receiver wavefield from the seismic data, acquired by the seismic receiver, the source wavefield representing the subterranean formation;
  decomposing the source wavefield into a source left-down/ right-up component and a source right-down/ left-up component;
  decomposing the receiver wavefield into a receiver left-down/right-up component and a receiver right-down/ left-up component;
  applying an inner product of the source left-down/right-up component and the receiver left-down/right-up component to generate a positive-dip imaging condition;
  applying an inner product of the source right-down/left-up component and the receiver right-down/left-up component to generate a negative-dip imaging condition;
  multiplying the positive-dip imaging condition with the negative-dip imaging condition to generate a diffraction-enhanced seismic image; and
  rendering the diffraction-enhanced seismic image for presentation on a user interface.

14. The one or more non-transitory computer readable media of claim 13, wherein generating the diffraction-enhanced seismic image is independent from separating reflection portions from diffraction portions of the seismic data.

15. The one or more non-transitory computer readable media of claim 13, wherein generating the diffraction-enhanced seismic image in reduces a computation cost by at least 40% relative to a computation cost of generating the diffraction-enhanced seismic image independent from multiplying the positive-dip imaging condition and the negative-dip imaging condition.

16. The one or more non-transitory computer readable media of claim 13, wherein the diffraction-enhanced seismic image comprises an increased field of illumination with respect to a seismic image generated independent from multiplying the positive-dip imaging condition and the negative-dip imaging condition.

17. The one or more non-transitory computer readable media of claim 13, wherein an up-going component of each of the source wavefield and the receiver wavefield is oriented toward a surface of the subterranean geological formation, and wherein a down-going component of each of the source wavefield and the receiver wavefield is oriented away from the surface of the subterranean geological formation.

* * * * *